(12) United States Patent  
Bender et al.

(10) Patent No.: US 7,990,578 B2  
(45) Date of Patent: Aug. 2, 2011

(54) PROCESSING PRINT JOBS

(75) Inventors: Michael Donald Bender, Nicholasville, KY (US); Raymond Edward Clark, Georgetown, KY (US); Robert Laurence Cook, Lexington, KY (US); Ning Ren, Lexington, KY (US); Martin Geoffrey Rivers, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 12/946,808

(22) Filed: Nov. 15, 2010

(65) Prior Publication Data

US 2011/0116130 A1    May 19, 2011

Related U.S. Application Data

(62) Division of application No. 10/810,004, filed on Mar. 26, 2004, now Pat. No. 7,835,030.

(51) Int. Cl.  
G06F 15/00 (2006.01)  
G06K 1/00 (2006.01)  
H04N 1/60 (2006.01)  
G06F 3/12 (2006.01)

(52) U.S. Cl. .......................... 358/1.9; 358/1.13

(58) Field of Classification Search ............... 358/1.1, 358/1.9, 1.18, 1.6, 1.2, 1.16, 1.17  
See application file for complete search history.

(56) References Cited

U.S. PATENT DOCUMENTS

| 5,638,498 | A | * | 6/1997 | Tyler et al. | 358/1.18 |
| 6,049,339 | A | * | 4/2000 | Schiller et al. | 345/630 |
| 6,535,293 | B1 | * | 3/2003 | Mitsuhashi | 358/1.13 |

* cited by examiner

Primary Examiner — Douglas Q Tran

(57) ABSTRACT

Methods for processing print jobs include flagging, or not, to-be-printed objects having PDL-specified math or logic functions requiring hard processing operations, such as two or more inputs. The math or logic functions preferably reside in ink attributes of display list objects corresponding to the to-be-printed objects. To-be-printed pages of the print job become divided into bands. Bands with to-be-printed objects therein have band display lists constructed in the event the to-be-printed objects become flagged. On a band-by-band basis, if bands have band display lists flagged with hard processing operations, contone bands become constructed. The contone bands result from color information blending between overlapping pixels of to-be-printed objects or an object and a contone page. A contone page includes color information of the to-be-printed page in a first color space. To-be-printed objects are rendered in a second color space in device specific page(s) of memory.

23 Claims, 35 Drawing Sheets

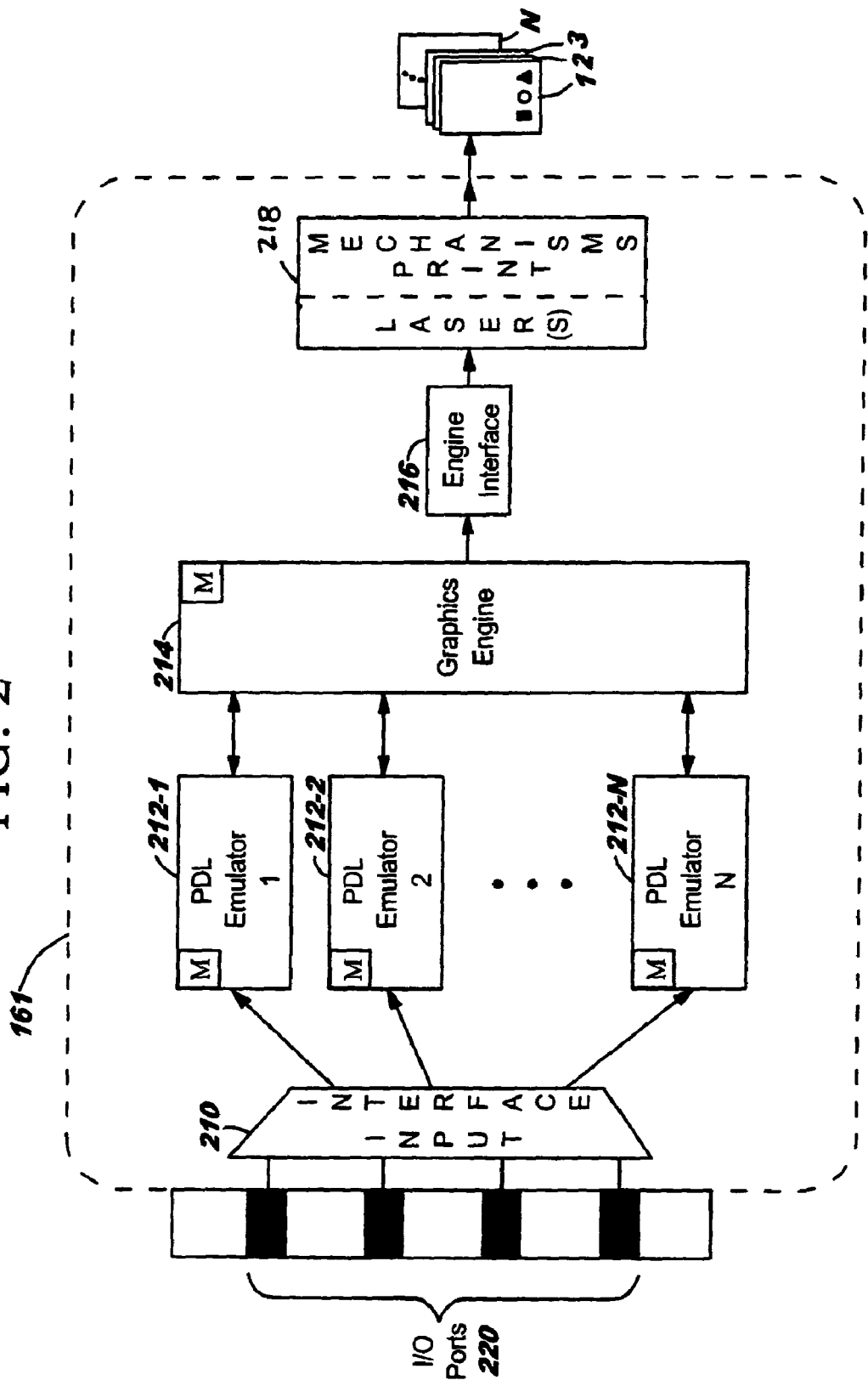

FIG. 3A  FIG. 3B  FIG. 3C
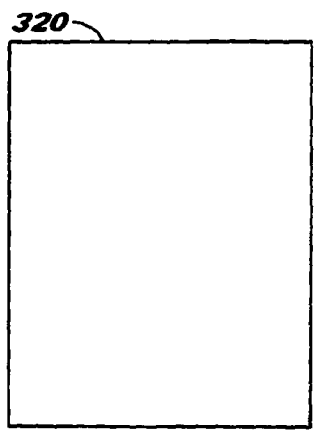 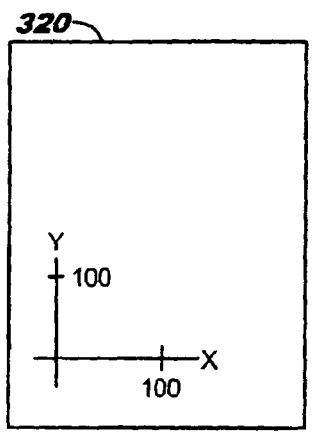 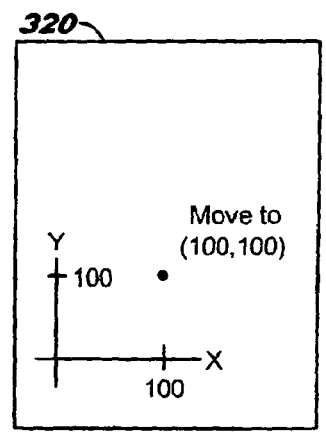
FIG. 3D  FIG. 3E  FIG. 3F
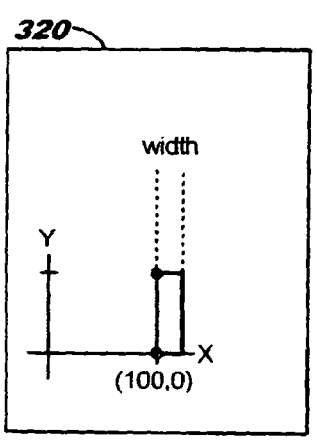 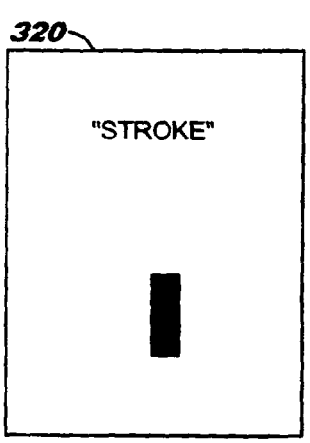 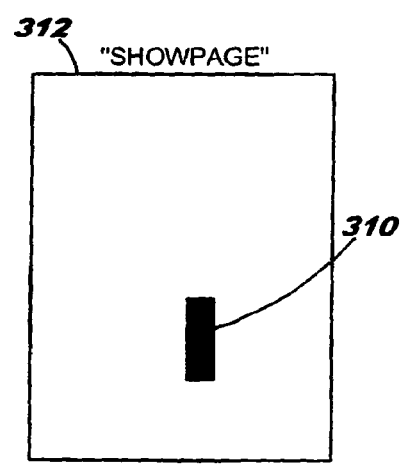

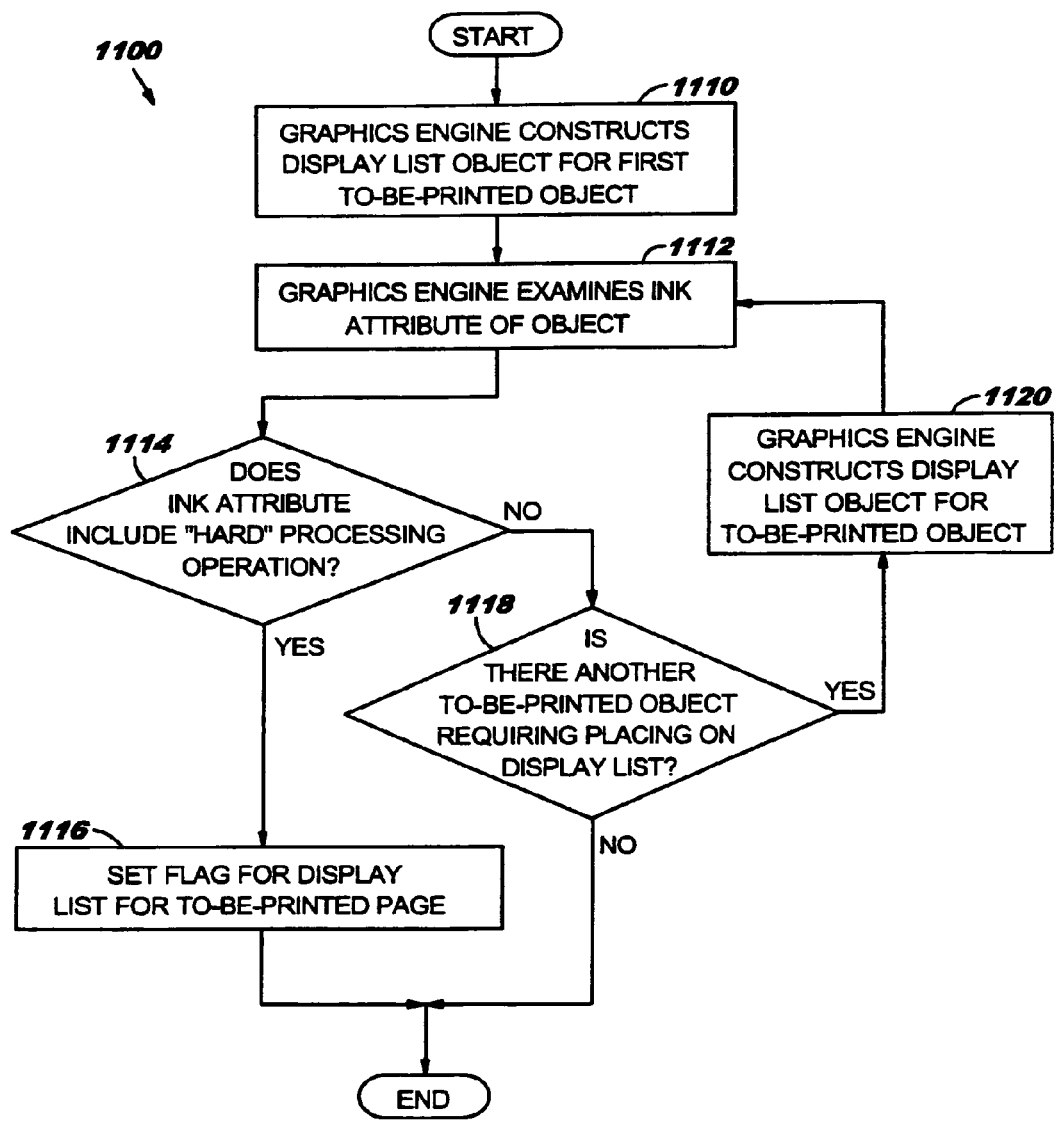

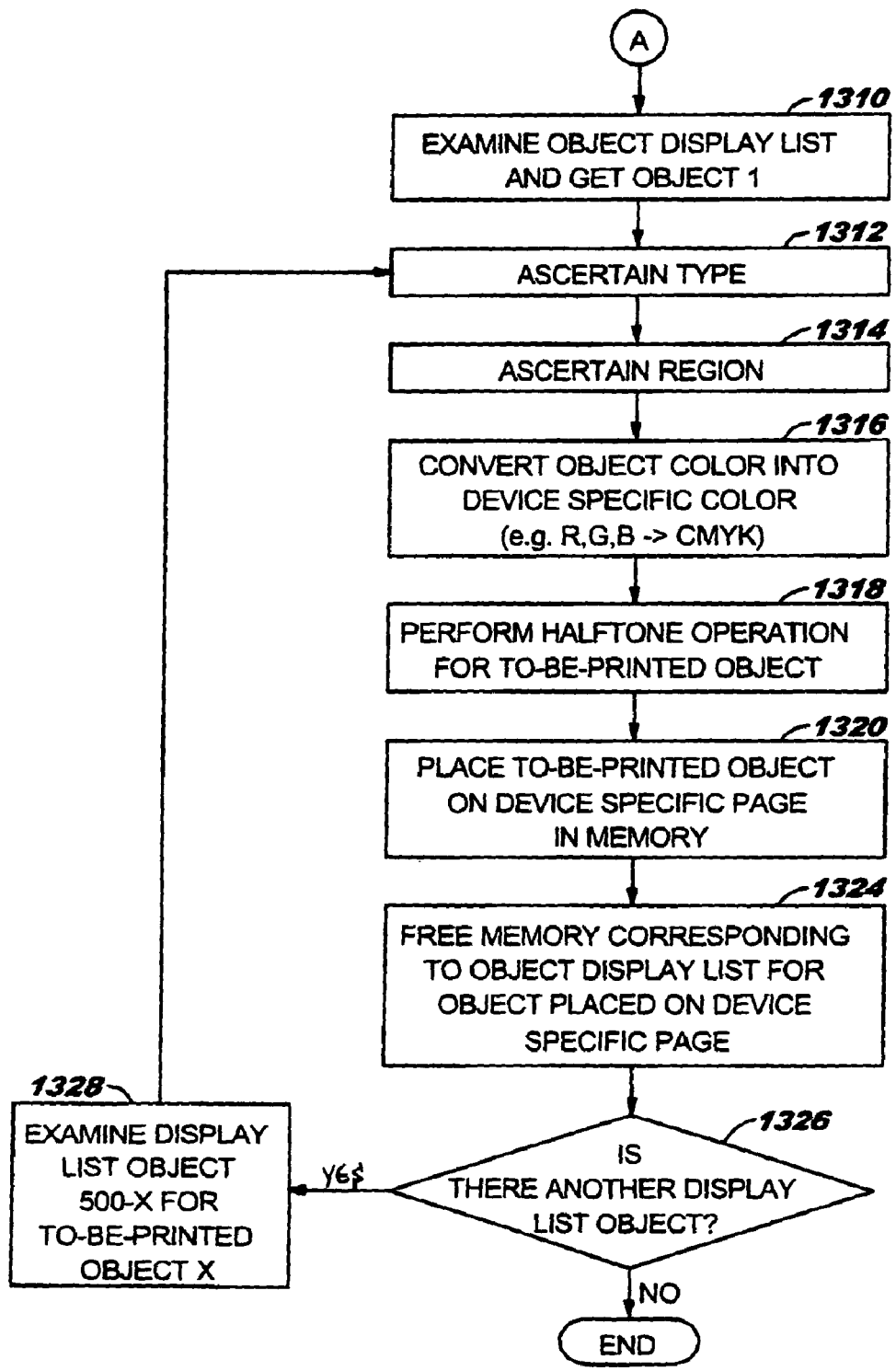

Object 1 — Red Rectangle
Object 2 — Green Ring
Object 3 — Blue Triangle

Object 1 F(CMYK)

Object 2 F(CMYK)

Object 3 F(CMYK)

PROCESSING PRINT JOBS

CROSS REFERENCE TO RELATED APPLICATION

Pursuant to 37 C.F.R. §1.78, this application is a divisional and claims the benefit of the earlier filing date of application Ser. No. 10/810,004, filed Mar. 26, 2004 now U.S. Pat. No. 7,835,030, entitled "Processing Print Jobs."

FIELD OF THE INVENTION

The present invention relates to processing print jobs. In particular, it relates to processing to-be-printed objects of print jobs along a variety of processing routes, especially in rendering devices such as printers. In preferred aspects, processing occurs in one manner for to-be-printed objects if they include PDL-specified math or logic functions deemed as having difficult or hard processing operations and in another manner if they do not. Flags become set or not in various display lists to identify these hard processing operations. Blending of color information, in a color space specified by the PDL, for example, occurs in bands of to-be-printed pages having objects identified with hard processing operations. Processing is preferably deferred in the embodiments until all to-be-printed objects of the to-be-printed page have been presented to the rendering device.

BACKGROUND OF THE INVENTION

The art of printing with rendering devices, such as laser or other printers, is relatively well known. In general, printing results by creating a bitmap of the print job and sending the bitmap to appropriate printing mechanisms to obtain a hard copy output. Typically, the bitmap includes color information converted from a color space specified in a PDL language by a host device, for example, into the color space required by the rendering device, further halftoned into pixels. Because of memory constraints, rendering devices often perform color conversion and halftoning immediately upon receipt of the object. Furthermore, the PDL may present objects destined for the same page in different color spaces. Problematically, if the objects require difficult or hard color blending operations, poor print quality results. Accordingly, a need exists in the printing arts for achieving properly blended colors of objects.

SUMMARY OF THE INVENTION

The above-mentioned and other problems become solved by applying the principles and teachings associated with the hereinafter described methods for processing print jobs in rendering devices, such as printers. In general, to-be-printed objects of print jobs become processed along one of three processing routes. In a first route, to-be-printed objects become rendered directly in device specific pages because they contain no math or logic functions deemed as hard processing operations. In a second route, they become rendered in bands, of to-be-printed pages of the print job, having no hard processing operations. In a third route, they become rendered in bands after being color-information blended with overlapping pixels of other objects. Preferably, the color-information blending occurs in the color space specified by the host device, for example. Rendering, on the other hand, includes converting color information specified by the host into the color space of the rendering device. It also includes halftoning of the objects. In this manner, color information blending operations only occur on to-be-printed objects having hard processing operations and do so at a time before conversion into the color space of the rendering device. This creates improved and accurate print quality.

With more specificity, methods for processing print jobs include flagging, or not, to-be-printed objects having PDL-specified math or logic functions requiring hard processing operations. In one aspect, hard processing operations include math or logic functions with two or more inputs. Preferably, the math or logic functions reside in ink or other attributes of display list objects constructed for the to-be-printed objects. If none of the to-be-printed objects for a given to-be-printed page of the print job are flagged, they become directly rendered into device specific pages. If flagged, the to-be-printed pages become divided into bands, preferably, of fixed equal sizes. Bands with to-be-printed objects therein have band display lists constructed. If bands have band display lists with no objects flagged as hard processing operations, the to-be-printed objects become rendered into device specific bands. If the band display lists are flagged, contone bands become constructed on a band-by-band basis. The contone bands losslessly represent color information of an original application and result from color information blending, in the color space specified by the host or other device, for example, between overlapping pixels of to-be-printed objects or an object and an initial representation of the to-be-printed page. Once all the to-be-printed objects of the contone band are processed, the resulting contone band is rendered into a device specific band in the memory of the rendering device. Rendering includes converting the contone bands into a color space of the rendering device and applying halftoning operations. In all embodiments, the foregoing processing is preferably deferred until all to-be-printed objects of the to-be-printed page have been presented to the rendering device.

In other embodiments, flag attributes become constructed for the display list. The flag attributes occur as single or multiple flag instances and become set or not depending upon hard processing operations or other criteria of the to-be-printed object. In some embodiments the flag attribute resides with the root of the display list and in some embodiments it resides with one or more of the objects. In other embodiments, it resides with both. The display list links objects together in memory locations via the functionality of one or more next pointers. Similarly, band display lists are constructed and each contains a flag that becomes set or not according to various criteria of the to-be-printed object.

Printer drivers for installation on host devices and graphics engines in laser printers are preferred structures for practicing the foregoing. To store information, both have dedicated memory or access to non-dedicated memory. The graphics engine embodiment preferably includes an interface with one or more PDL emulators dedicated to processing a particular language type, such as PCL, Postscript or the like. It also includes an interface with an engine interface and, when processing is complete, the graphics engine hands off a bitmap, in device specific colors and halftoned, to an engine interface to invoke the print mechanisms of a laser printer to produce a hard copy output. The printer driver embodiment preferably includes computer executable instructions on optical disks or other storage medium and/or can be downloaded from the internet, for example.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIG. 2 is a diagrammatic view in accordance with the teachings of the present invention of a rendering device in the form of a laser printer;

FIGS. 3A-3F are representative memory pages in accordance with the teachings of the present invention for producing a hard copy output;

FIG. 11A is a flow chart in accordance with the teachings of the present invention for setting a flag or not on a display list;

FIG. 13 is a flow chart in accordance with the teachings of the present invention of the rendering of a device specific page in memory for display lists not having a flag attribute set;

DETAILED DESCRIPTION OF THE PREFERRED EMBODIMENTS

In the following detailed description of the preferred embodiments, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized and that process, electrical, mechanical and/or software changes may be made without departing from the scope of the present invention. The following detailed description is, therefore, not to be taken in a limiting sense, and the scope of the present invention is defined only by the appended claims and their equivalents. In accordance with the present invention, methods and apparatus for processing print jobs in a rendering device are hereinafter described.

Figure 1:
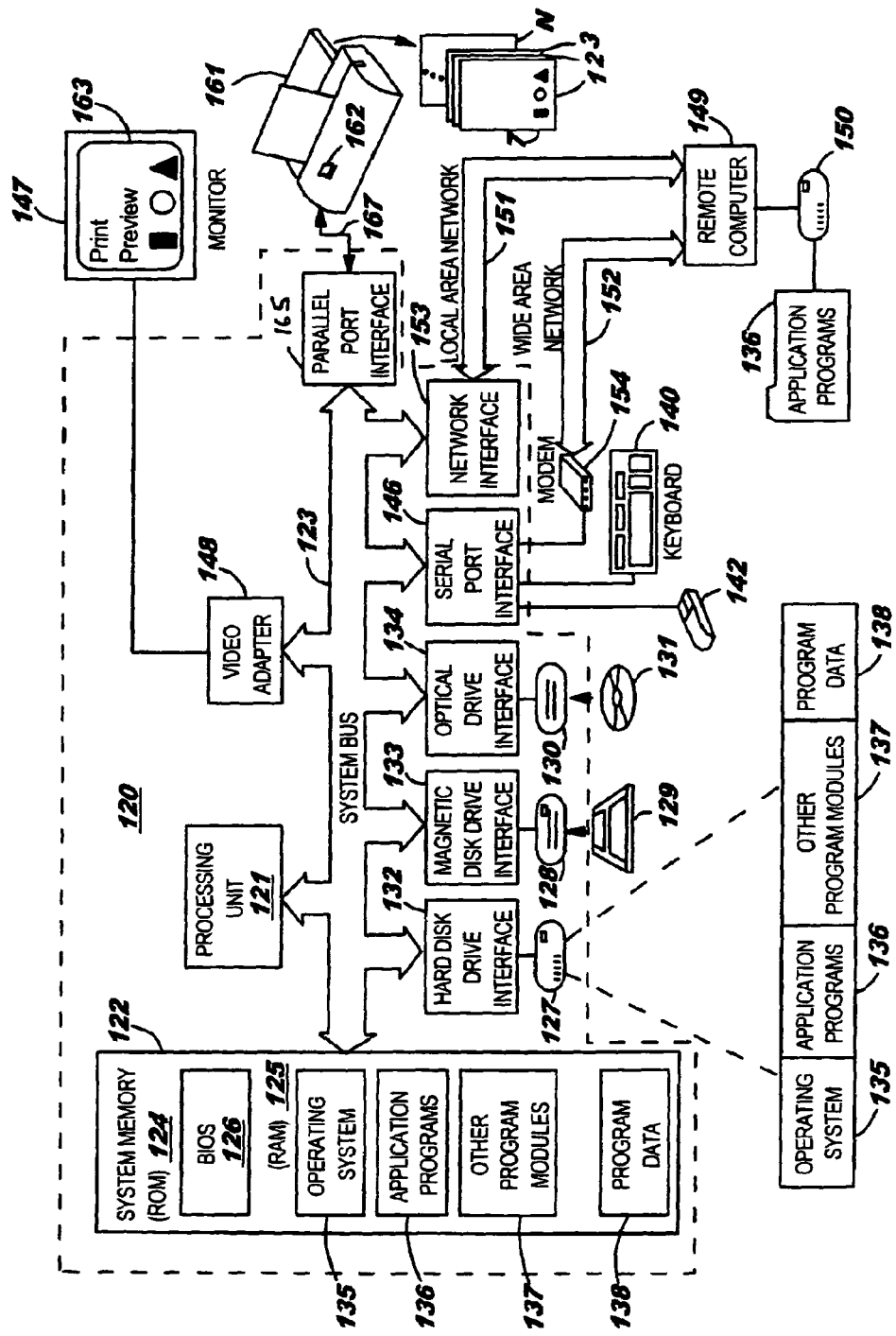
FIG. 1 is a diagrammatic view in accordance with the teachings of the present invention of a representative operating environment in which the invention may be practiced.

Appreciating users of the invention will likely accomplish some aspect of the methods in a computing system environment, FIG. 1 and the following discussion are intended to provide a brief, general description of a suitable computing environment in which either the structure or processing of embodiments may be implemented. Since the following may be computer implemented, particular embodiments may range from computer executable instructions as part of computer readable media to hardware used in any or all of the following depicted structures. Implementation may additionally be combinations of hardware and computer executable instructions. Further, implementation may occur in an environment not having the following computing system environment so the invention is only limited by the appended claims and their equivalents.

When described in the context of computer readable media having computer executable instructions stored thereon, it is denoted that the instructions include program modules, routines, programs, objects, components, data structures, patterns, trigger mechanisms, signal initiators, etc. that perform particular tasks or implement particular abstract data types upon or within various structures of the computing environment. Executable instructions exemplarily comprise instructions and data which cause a general purpose computer, special purpose computer, or special or general purpose processing device to perform a certain function or group of functions.

The computer readable media can be any available media which can be accessed by a general purpose or special purpose computer or device. By way of example, and not limitation, such computer readable media can comprise RAM, ROM, EEPROM, CD-ROM or other optical disk storage devices, magnetic disk storage devices or any other medium which can be used to store the desired executable instructions or data fields and which can then be accessed. Combinations of the above should also be included within the scope of the computer readable media. For brevity, computer readable media having computer executable instructions may sometimes be referred to as software or computer software.

With reference to FIG. 1, an exemplary system for implementing the invention includes a general purpose computing device in the form of a conventional computer 120. The computer 120 includes a processing unit 121, a system memory 122, and a system bus 123 that couples various system components including the system memory to the processing unit 121. The system bus 123 may be any of the several types of bus structures including a memory bus or memory controller, a peripheral bus, and a local bus using any of a variety of bus architectures. The system memory includes read only memory (ROM) 124 and a random access memory (RAM) 125. A basic input/output system (BIOS) 126, containing the basic routines that help to transfer information between elements within the computer 120, such as during start-up, may be stored in ROM 124. The computer 120 may also include a magnetic hard disk drive 127, a magnetic disk drive 128 for reading from and writing to removable magnetic disk 129, and an optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the computer 120.

Although the exemplary environment described herein employs a hard disk, a removable magnetic disk 129 and a removable optical disk 131, it should be appreciated by those skilled in the art that other types of computer readable media exist which can store data accessible by a computer, including magnetic cassettes, flash memory cards, digital video disks, removable disks, Bernoulli cartridges, random access memories (RAMs), read only memories (ROM), downloads from the internet and the like. Other storage devices are also contemplated as available to the exemplary computing system. Such storage devices may comprise any number or type of storage media including, but not limited to, high-end, high-throughput magnetic disks, one or more normal disks, optical disks, jukeboxes of optical disks, tape silos, and/or collections of tapes or other storage devices that are stored off-line. In general however, the various storage devices may be partitioned into two basic categories. The first category is local storage which contains information that is locally available to the computer system. The second category is remote storage which includes any type of storage device that contains information that is not locally available to a computer system. While the line between the two categories of devices may not be well defined, in general, local storage has a relatively quick access time and is used to store frequently accessed data, while remote storage has a much longer access time and is used to store data that is accessed less frequently. The capacity of remote storage is also typically an order of magnitude larger than the capacity of local storage.

A number of program modules may be stored on the hard disk 127, magnetic disk 129, optical disk 131, ROM 124 or RAM 125, including but not limited to an operating system 135, one or more application programs 136, other program modules 137, and program data 138. Such application programs may include, but are not limited to, word processing programs, drawing programs, games, viewer modules, graphical user interfaces, image processing modules, intelligent systems modules or other known or hereinafter invented programs. A user enters commands and information into the computer 120 through input devices such as keyboard 140 and pointing device 142. Other input devices (not shown) may include a microphone, joy stick, game pad, satellite dish, scanner, camera, personal data assistant, or the like. These and other input devices are often connected to the processing unit 121 through a serial port interface 146 that couples directly to the system bus 123. It may also connect by other interfaces, such as parallel port, game port, firewire or a universal serial bus (USB).

A monitor 147 or other type of display device connects to the system bus 123 via an interface, such as a video adapter 148. In addition to the monitor, computers often include other peripheral output devices, such as speakers (not shown). Other output or rendering devices include printers, such as a laser printer 161, for producing hard copy outputs of sheets 1, 2, 3 . . . N of paper or other media, such as transparencies. In general, the hard copy output appears as a representation of what a user might view in a print preview screen 163 of an original program application displayed on the monitor. In this instance, the hard copy appears as three side-by-side objects, especially a red (interior-filled) vertically oriented rectangle, a green ring with a white interior and a blue (interior-filled) triangle, and all reside in a non-overlapping fashion near a bottom portion 7 of sheet 1. Hereafter, these three objects will be used to describe a working example in which the invention may be used and practiced. In one embodiment, the printer 161 connects to the computer or host device by direct connection to the system bus via a cable 167 attached to parallel port interface 165. In other embodiments, it connects via the serial port interface, USB, Ethernet or other. Often times a driver, for installing necessary software on the computer 120 for the computer and printer to interface properly and to provide a suitable user interface with the printer via the monitor, becomes inserted as the optical disk 131, the magnetic disk 129 or can be downloaded via the internet or retrieved from another entity as a file. Some forms of the present invention contemplate the driver as storing computer executable instructions for executing the methods of the present invention.

During use, the computer 120 may operate in a networked environment using logical connections to one or more other computing configurations, such as a remote computer 149.

Remote computer 149 may be a personal computer, a server, a router, a network PC, a peer device or other common network node, and typically includes many or all of the elements described above relative to the computer 120, although only a memory storage device 150 having application programs 136 has been illustrated. The logical connections between the computer 120 and the remote computer 149 include a local area network (LAN) 151 and/or a wide area network (WAN) 152 that are presented here by way of example and not limitation. Such networking environments are commonplace in offices with enterprise-wide computer networks, intranets and the Internet, but may also be adapted for use in a mobile environment at multiple fixed or changing locations.

When used in a LAN networking environment, the computer 120 is connected to the local area network 151 through a network interface or adapter 153. When used in a WAN networking environment, the computer 120 typically includes a modem 154, T1 line, satellite or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the local or remote memory storage devices and may be linked to various processing devices for performing certain tasks. It will be appreciated that the network connections shown are exemplary and other means of establishing a communications link between the computers may be used. Moreover, those skilled in the art will appreciate that the invention may be practiced with other computer system configurations, including host devices in the form of hand-held devices, multi-processor systems, microprocessor-based or programmable consumer electronics, network PCs, minicomputers, computer clusters, main frame computers, and the like.

With reference to FIG. 2, the rendering device or printer 161 of FIG. 1 is described in more detail. In one embodiment, the printer includes the following functional blocks: an input interface 210; pluralities of PDL emulators 212-1, 212-2 . . . 212-N; a graphics engine 214; an engine interface 216; and print mechanisms 218, including one or more lasers. Of course, the printer has other well known functional components (not shown) to effectuate printing of sheets 1, 2, 3 . . . N, of a print job including a controller often embodied as an ASIC or microprocessor, system memory, buffers, memory card slots/readers, a user-input control panel with discrete buttons and/or software, and the like. Some of these other components may actually be the source of print job. The printer connects to the computer 120 (FIG. 1) via IR, wirelessly or a cable connected to one of its many input/output (I/O) ports 220. Representative I/O ports include a parallel port, a serial port, a USB port, or a network port, such as Ethernet, LAN, WAN or the like. In addition to or in substitution for the computer 120, the printer can also interface with other host devices. For example, it may interface directly with a digital camera, a personal data assistant, an optical code reader, a scanner, a memory card, or other known or hereafter developed software or apparatus.

During use, as is known, when the host or other device has a print job ready for printing, the host sends data to the printer in a form ready for processing by the printer. Often, this data embodies the well known form of a page description language or PDL. In general, PDL is a language (expression protocol) indicating which parts of a page contain text characters and which parts contain graphic images. It also has instructions on how to draw a to-be-printed object and its control therefor. It further includes a protocol for describing bitmap data. Some of the more well known forms of PDLs include Hewlett Packard's printer control language (PCL), PCLXL, Adobe's POSTSCRIPT, Canon's LIPS, IBM's PAGES and IPDS, to name a few. Yet, the printer does not know how many host or other devices are connected to it, on which I/O port(s) they may reside and in what form the PDL print job will arrive. Accordingly, the input interface 210 of the printer performs the following two well known functions. First, it assesses (by looping through the I/O ports) which, if any, of the I/O ports have a print job for the printer and, if a print job exists, locks onto such port. Second, it supplies the print job to the appropriate PDL emulator 212 in accordance with the PDL language type. As shown in FIG. 2, PDL emulators within the printer preferably exist as one emulator per one PDL language type (e.g., one PDL emulator 212-1 for PCL, one PDL emulator 212-2 for POSTSCRIPT, etc.). Downstream, the PDL emulator communicates/interfaces with the graphics engine 214. Generally speaking, the PDL emulator interfaces between the computer and the graphics engine to interpret the language of the PDL file, of any given print job, for the benefit of the graphics engine.

As an example, consider the following PDL file, embodied as an imaginary POSTSCRIPT file, having programming language tokens or command operations, as in Lines 1-6, for rudimentarily printing a thin black line 310 (FIG. 3F) near a bottom center of a to-be-printed page 312 to-be-output from a printer:

| | |
|---|---|
| 0 0 0 setrgbcolor | (Line 1) |
| 1 setlinewidth | (Line 2) |
| 100 100 moveto | (Line 3) |
| 100 0 lineto | (Line 4) |
| stroke | (Line 5) |
| showpage | (Line 6) |

As a preliminary matter, skilled artisans will appreciate the color (black) of the to-be-printed object (e.g., thin black line 310) first appears to the printer in a color space specified by the host or other device and it is incumbent upon the printer to convert such color space into whatever colors it functions in. In this instance, the color received by the printer corresponds to red, green, blue (r, g, b) color values which, in turn, relate to the colors generated by the monitor 147 (FIG. 1). Many printers function in cyan (C), magenta (M) and yellow (Y) toners, or CMY and black (K), and the printer needs to eventually convert such r, g, b into CMYK.

Interpreting these lines of code, the color (black) of to-be-printed object (i.e., thin black line 310) has a red color in the computer color plane corresponding to a zero value (please appreciate this number ranges between a plurality of values that maps generally to 256 possible different color selections), a green color corresponding to a zero value and a blue color corresponding to a zero value, or black. The object has a linewidth value of 1 point (1/72", for example). With reference to FIGS. 3A-3E, the to-be-printed object begins in a page of virtual memory 320 at a coordinate value of 100, 100 (e.g., an x-y coordinate plane corresponding to an x-y plane of the to-be-printed page 312). Thereafter, the printer has a line (please appreciate a "line" with a linewidth of 1 point actually appears as a stencil or a rectangular box as seen, greatly exaggerated, in FIG. 3D) drawn in memory from coordinate 100, 100 to the coordinate 100, 0. The operation command "stroke" tells the printer to now "paint" the line (e.g., fill in the stencil or rectangular box). Appreciating all this gets virtually performed in memory before actually printing an object on a piece of paper, the operation command "showpage" actually invokes the lasers, toner and paper pick of the printer to make the thin black line appear on the paper.

Regarding the interaction between the PDL emulator 212 and the graphics engine 214, it occurs in a well known iterative or back-and-forth manner. For example, the PDL emulator sequentially parses or processes a single command line of the above PDL file and relays it to the graphics engine. In response, the graphics engine returns information to the emulator notifying it of completion, for example, and then the PDL emulator goes and processes the next command line. The PDL emulator then communicates to the graphics engine about the next line of the PDL file, whereby the graphics engine responds, and so on until complete. In actuality, however, each individual command line need not require interaction with the graphics engine or any one single command line may invoke many interactions with the graphics engine and is well known in the art. To facilitate processing, each of the emulator and graphics engine have access to their own dedicated memory (M) for these and other purposes. In addition, during the "showpage" command operation, the 0, 0, 0 red, green, blue colors of the PDL file become converted into the CMYK toner colors of the rendering device printer. Preferably, the graphics engine performs this conversion and stores the printer colors in what artisans refer to as device specific colors or color planes. In this instance, since four colors exist in the printer (C, M, Y, K), the graphics engine stores four color planes. Skilled artisans also know color conversion from computers, or other hosts, into device specific colors occurs through well known processes often comprising specific entries in a look-up table and linear or other interpolation methods between the specific entries.

To actually invoke the lasers of the printer or other print mechanisms 218 (including, but not limited to, paper pick mechanisms, rollers, belts, photoconductive members, fusers, sheet feeders, toner cartridges, duplexers, and the like), the graphics engine 214 communicates directly with an engine interface 216. Preferably, the graphics engine supplies a bitmap rendered in device specific color and halftoned. The engine interface, in turn, supplies the requisite information, usually in the form of signals, to the print mechanisms to produce hard copy sheets 1, 2, 3 . . . N, for example.

Figure 4:
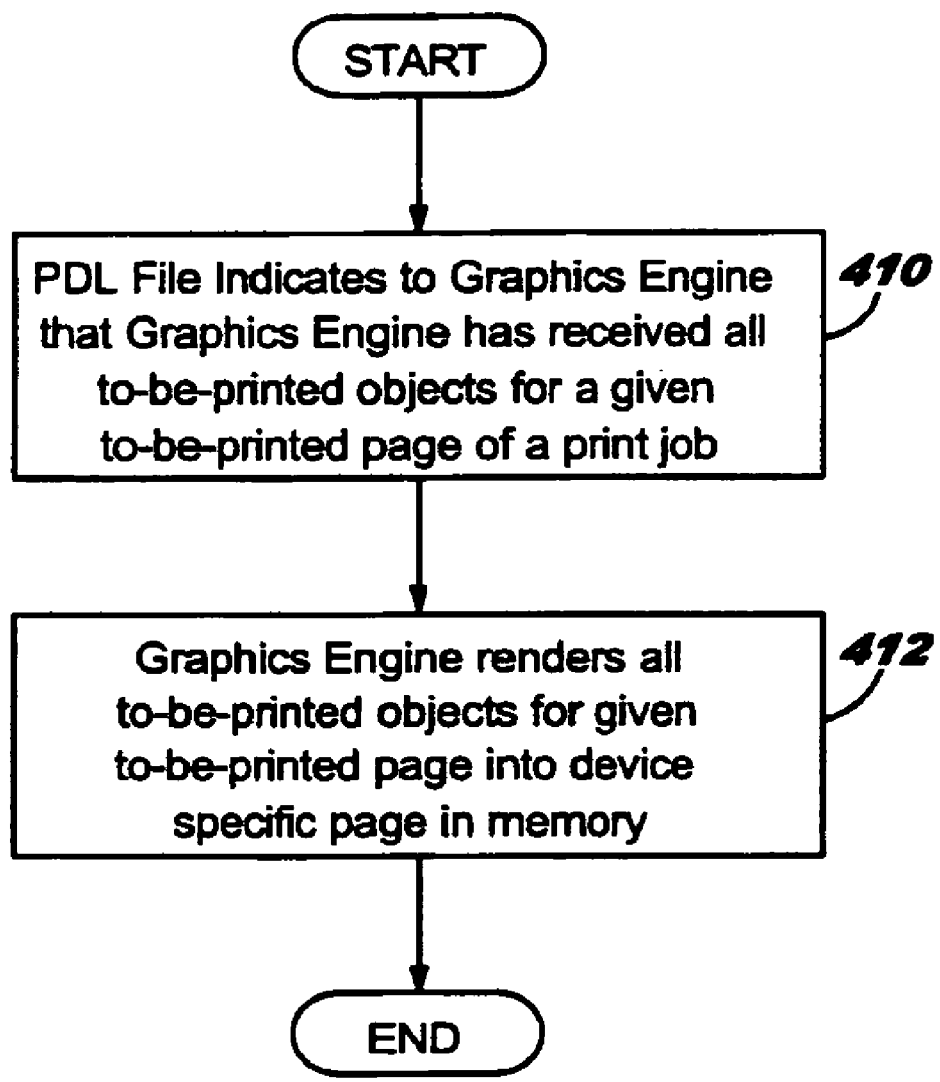
FIG. 4 is a flow chart in accordance with the teachings of the present invention indicating when the graphics engine preferably renders to-be-printed objects for a given to-be-printed page of a print job into device specific pages in memory.

For any given print job, the PDL file (through the PDL emulator) will eventually signal or indicate to the graphics engine that the graphics engine has been presented with or received all to-be-printed objects for a given page of a print job. In some instances, this occurs when the PDL emulator calls for the graphics engine to perform the "showpage" command. With reference to FIG. 4, this step 410 then invokes the graphics engine to render all the to-be-printed objects for that given page into a device specific page in memory, step 412. Preferably, this memory corresponds to the graphics engine dedicated memory M but may be any memory, local or remote, the graphics engine has access to. In an alternate embodiment, the rendering of the to-be-printed objects into device specific pages of memory occurs at the completion of receipt of more than one to-be-printed page of the print job or occurs before the completion of receipt of a single to-be-printed page.

The rendering of to-be-printed objects occurs, first, by having the graphics engine build, create or otherwise construct a display list having one or more to-be-printed objects for a given to-be-printed page. In essence, the display list comprises pluralities of data structures found in addresses or locations linked in memory that together describe a given to-be-printed object(s) and a to-be-printed page. A display list root begins the display list and points to the first object. The first object then points to the second object and so on until all objects are connected, in memory, for a given to-be-printed page of a print job. Preferably, all object(s) on the display list occur in the same exact order that the PDL file presented them to the graphics engine. Alternately, the display list order can be constructed to preserve the time domain order of color blending operations for each and every pixel on the to-be-printed page across all objects presented by the PDL.

Figure 5:
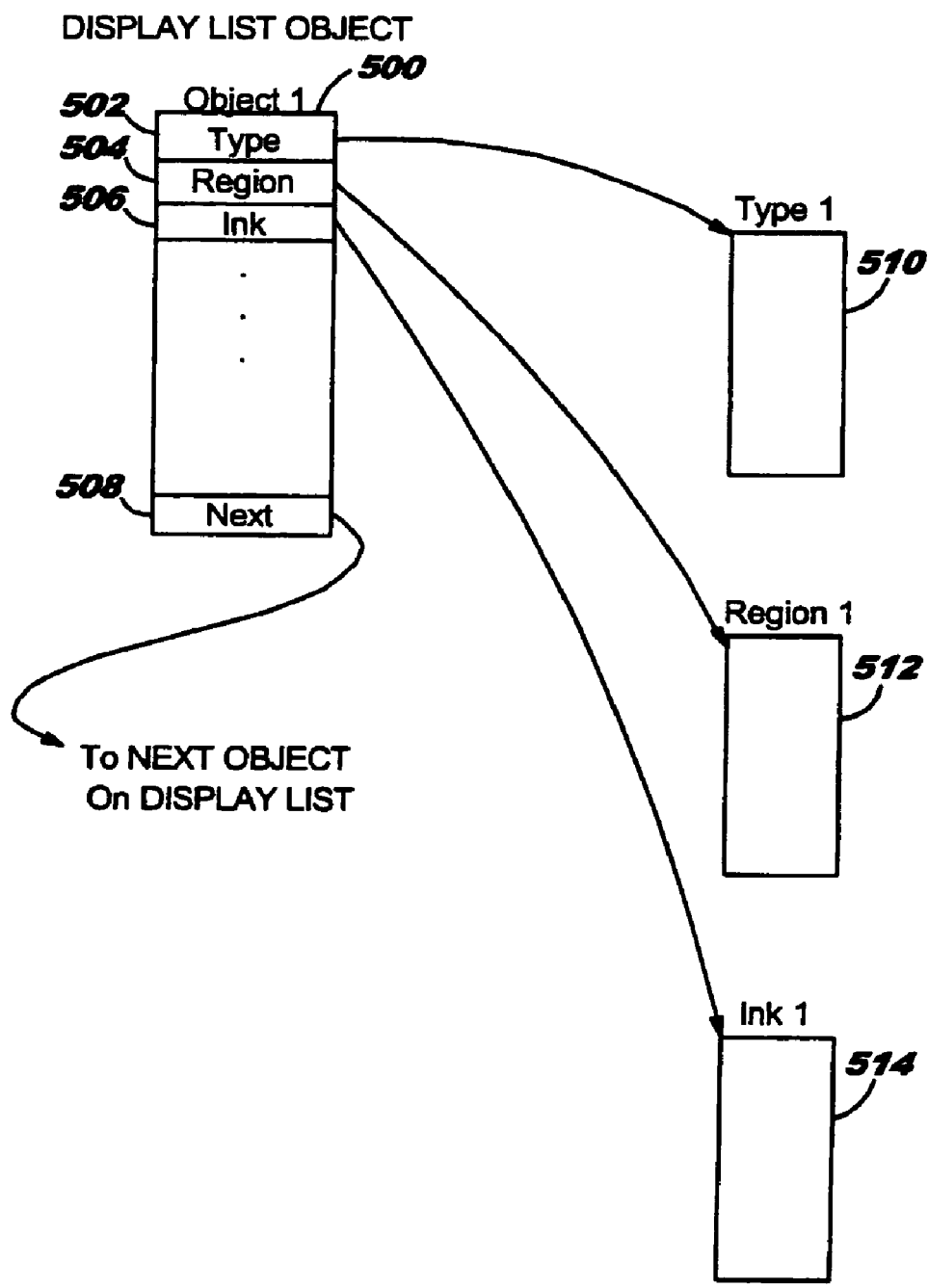
FIG. 5 is a diagrammatic view in accordance with the teachings of the present invention of a display list object.

In more specificity, FIG. 5, a display list object 500 for any given object preferably includes, but is not limited to, the attributes of object type 502, object region 504 and object ink 506. Attributes, as used herein, are typically presented to the graphics engine in accordance with the language type of the PDL. Attributes, however, may also be indirectly influenced by the printer or operator, via the driver or operator panel 162 on the printer 161, for example. A next pointer 508 is also included on the display list object 500 but does not substantively represent an attribute of the object. It merely points to the next object on the display list as will be described later in more detail. The attributes themselves point to specific other memory locations or addresses 510, 512, 514 that more particularly define the object type, the object region and the object ink, respectively.

Figure 6A:
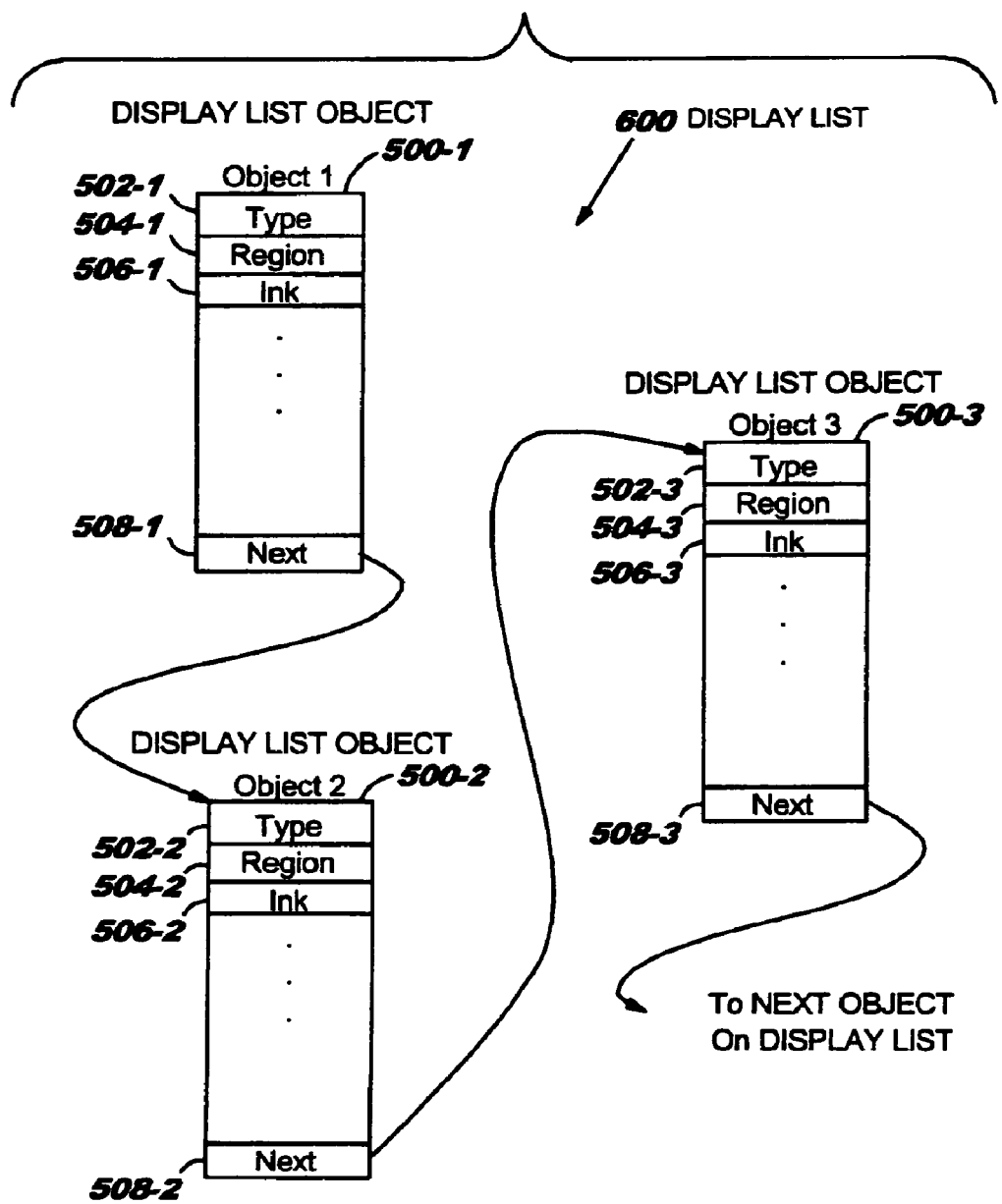
FIG. 6A is a diagrammatic view in accordance with the teachings of the present invention of a display list having pluralities of objects.
Figure 6B:
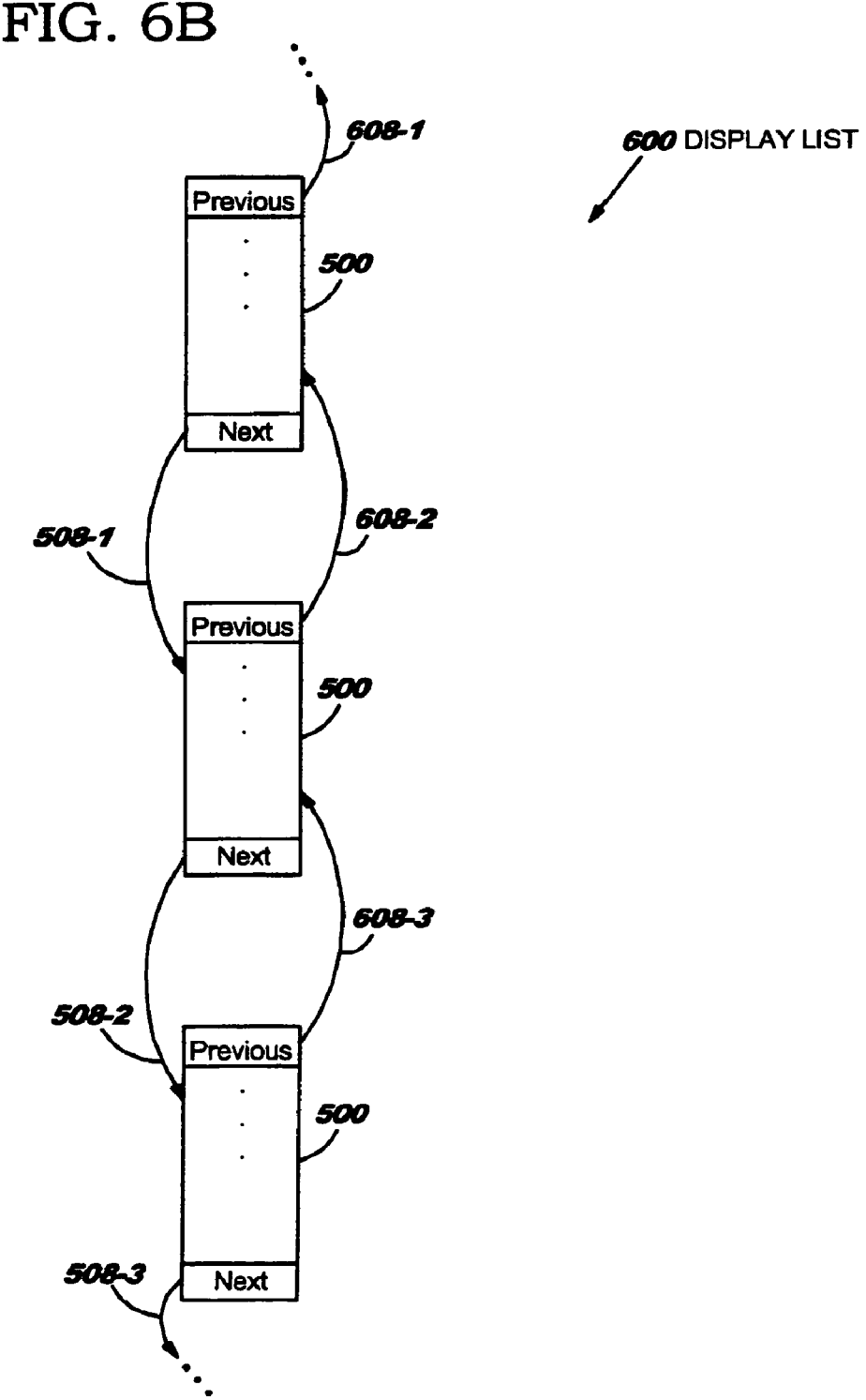
FIG. 6B is a diagrammatic view in accordance with the teachings of the present invention of an alternate embodiment of a display list having pluralities of objects.

In one embodiment, the object type attribute corresponds to whether the to-be-printed object is an image, such as a jpeg, a stencil, such as a rectangle, or a character (a, b, c . . . x, y, z, 0, 1, 2, . . . ). In other embodiments, it could correspond to a group of related objects. The object region attribute corresponds to the physical location of the to-be-printed object on the to-be-printed page and the geography of the object type, such as the pixel dimensions of a rectangular stencil. It may also include information useful in processing the object such as a region bounding box as will be described in more detail with reference to FIG. 24. The object ink attribute corresponds generally to how to "paint" each pixel within the object region. With more specificity, the painting of each pixel means 1) what color to apply to each pixel for that to-be-printed object; and 2) how to apply pixel coloring in instances when pixels of multiple objects overlap one another on the to-be-printed page. In category 2), this typically includes a math or logic function specified, in a well known manner by the PDL as part of the PDL file, such as a Boolean expression, when the PDL emulator is of PCL language type, or an algebraic expression for PDF languages. As a representative example, a PCL language has 256 possible logic functions. A PDF language has about 16 math or logic functions. Although shown in a given order on the display list object 500, the attributes may occur in any order desirable and the actual memory locations representing the attributes of the object need not be contiguous or sequential. With reference to FIG. 6A, a more comprehensive display list 600 is shown with pluralities of display list objects 500-1, 500-2, 500-3 linked together for a given to-be-printed page of a print job via the functionality of the next pointer 508-1, 508-2, 508-3 as previously discussed. In FIG. 6B, the objects (generically 500) of the display list 600 may alternatively be doubly linked via the functionality of both next and previous pointers 608-1, 608-2, 608-3, etc. In still other embodiments, the pointers need not point to immediately preceding or following objects and/or each object 500 may have pointers in addition to those shown. Of course, each object 500 still includes their other attributes and ellipses between the next and previous pointers indicate this feature.

Figure 7:
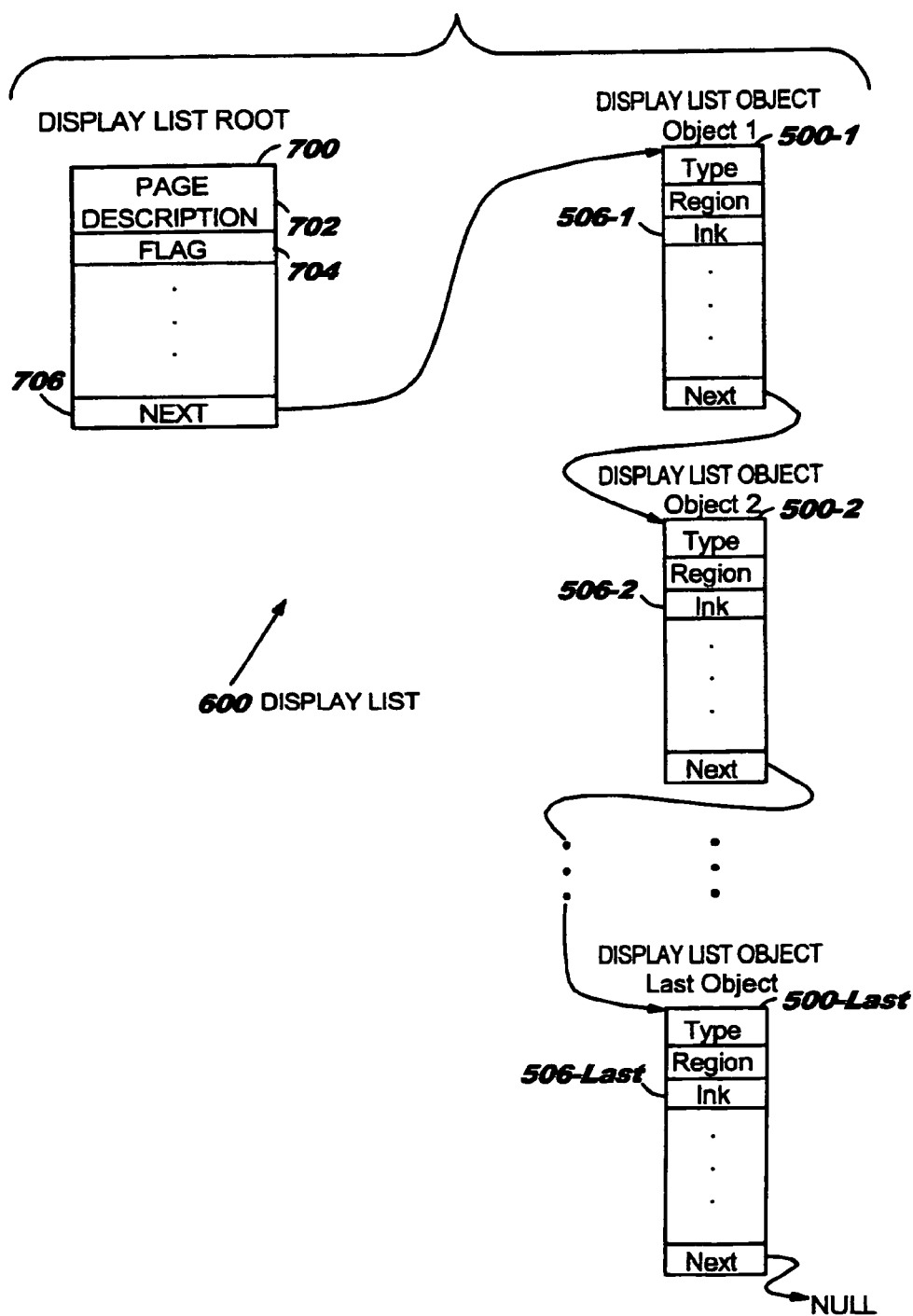
FIG. 7 is a diagrammatic view in accordance with the teachings of the present invention of a display list having pluralities of objects and a root.

With reference to FIG. 7, the display list 600 for a given to-be-printed page may also include a display list root 700 constructed by the graphics engine, and stored in memory, that precedes the first display list object 500-1 and points thereto. In general, the root describes the physical to-beprinted page and the virtual page in memory corresponding thereto. In one embodiment, the root 700 includes attributes for describing this, including a to-be-printed page description attribute 702 and a flag attribute 704. The page description 702 attribute includes information such as the size of the to-be-printed page (e.g., 8.5"×11", A4, etc.), page type (e.g., paper, transparency, glossy, etc.) and the like. It may also contain information specifying the color space in which to-be-printed objects will become blended. The flag 704 attribute, as will be described in more detail below, becomes set or not (e.g., on or off) for the entirety of the to-be-printed page to indicate whether any of the math or logic functions within the ink attributes 506-1, 506-2, 506-3, etc., of any of the display list objects 500-1, 500-2, 500-3, etc., include a difficult, complex or otherwise "hard" processing operation. If they do, the flag is set. If they do not, the flag is not set. As used herein, a hard processing operation means any math or logic function, previously described, having two or more inputs. Alternatively, the flag 704 attribute can become set or not for the entirety, or a partiality, of the to-be-printed page to indicate any other criterion or criteria such as the presence or absence, the on or off, or meeting of a condition, or not, in any of the display list objects 500. Still alternatively, the flag attribute may become set or not depending upon whether the math or logic function is a Boolean or an algebraic equation in accordance with the popular PCL or PDF languages. In addition, the condition may reside in an attribute of an object other than or in addition to the ink attribute 506. The condition may also appear in the display list root in addition to or in the absence of a condition appearing in one or more of the display list objects.

Figure 8:
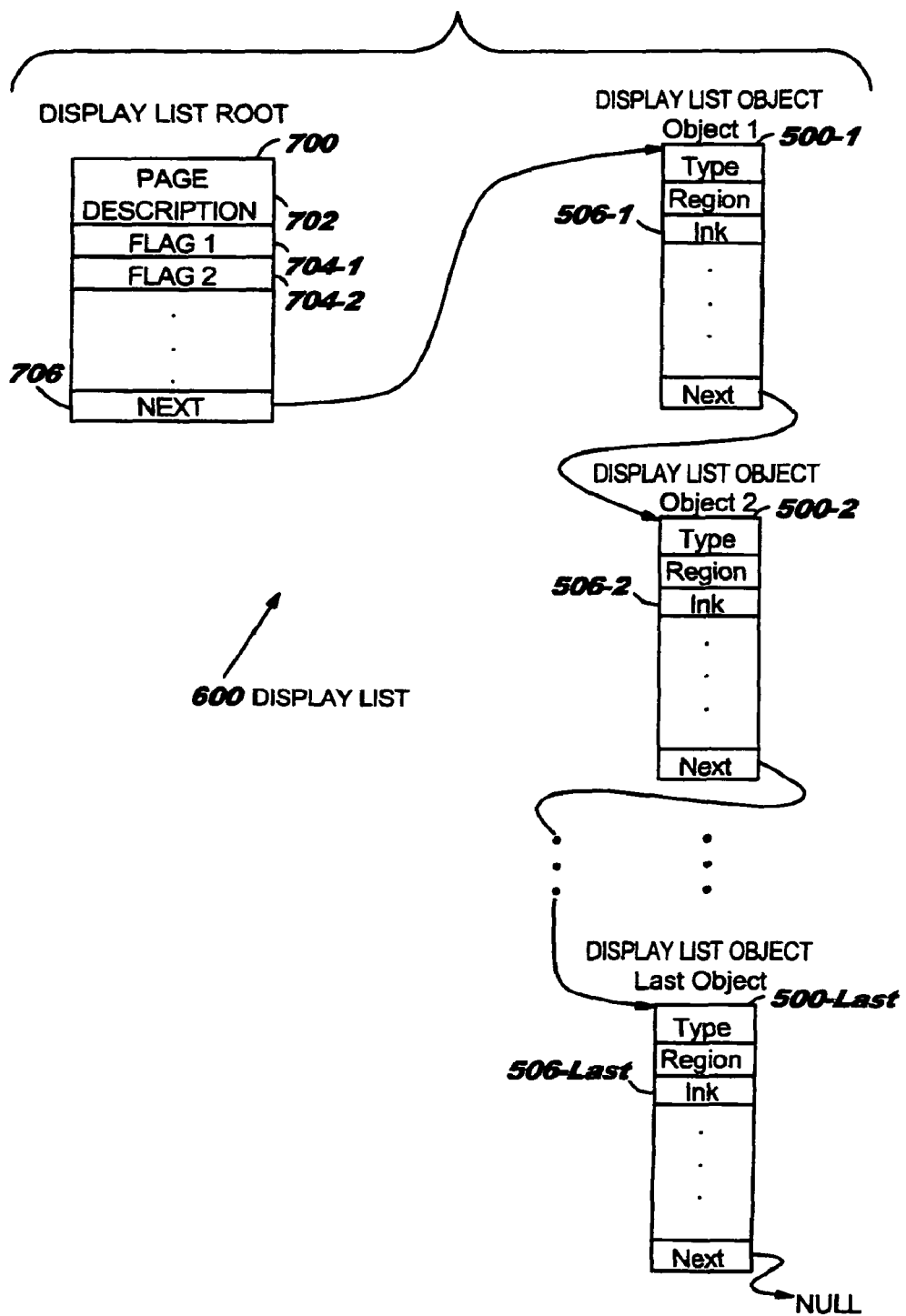
FIG. 8 is a diagrammatic view in accordance with the teachings of the present invention of an alternate embodiment of a display list having pluralities of objects and a root.
Figure 9:
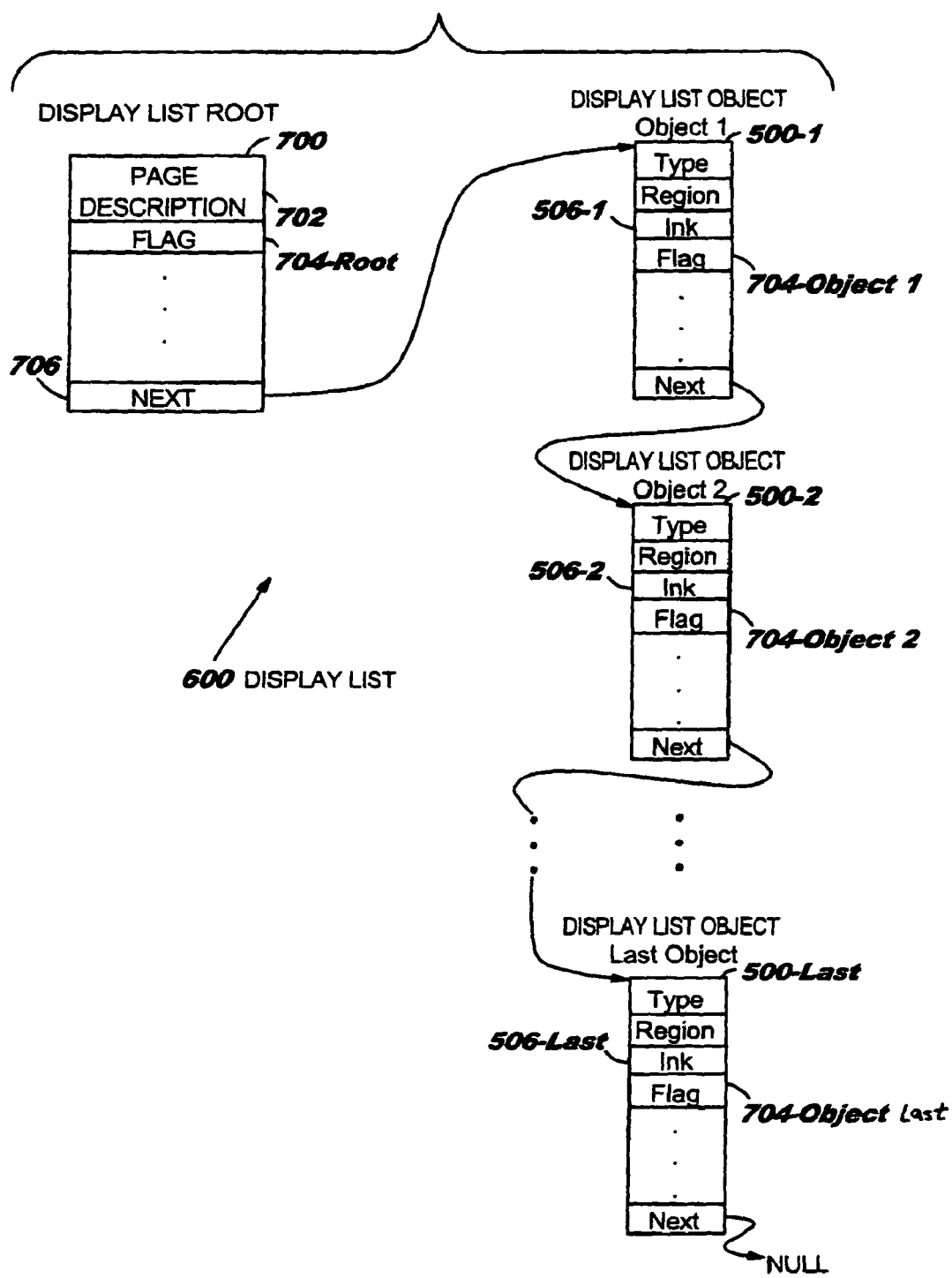
FIG. 9 is a diagrammatic view in accordance with the teachings of the present invention of another alternate embodiment of a display list having pluralities of objects and a root.
Figure 10:
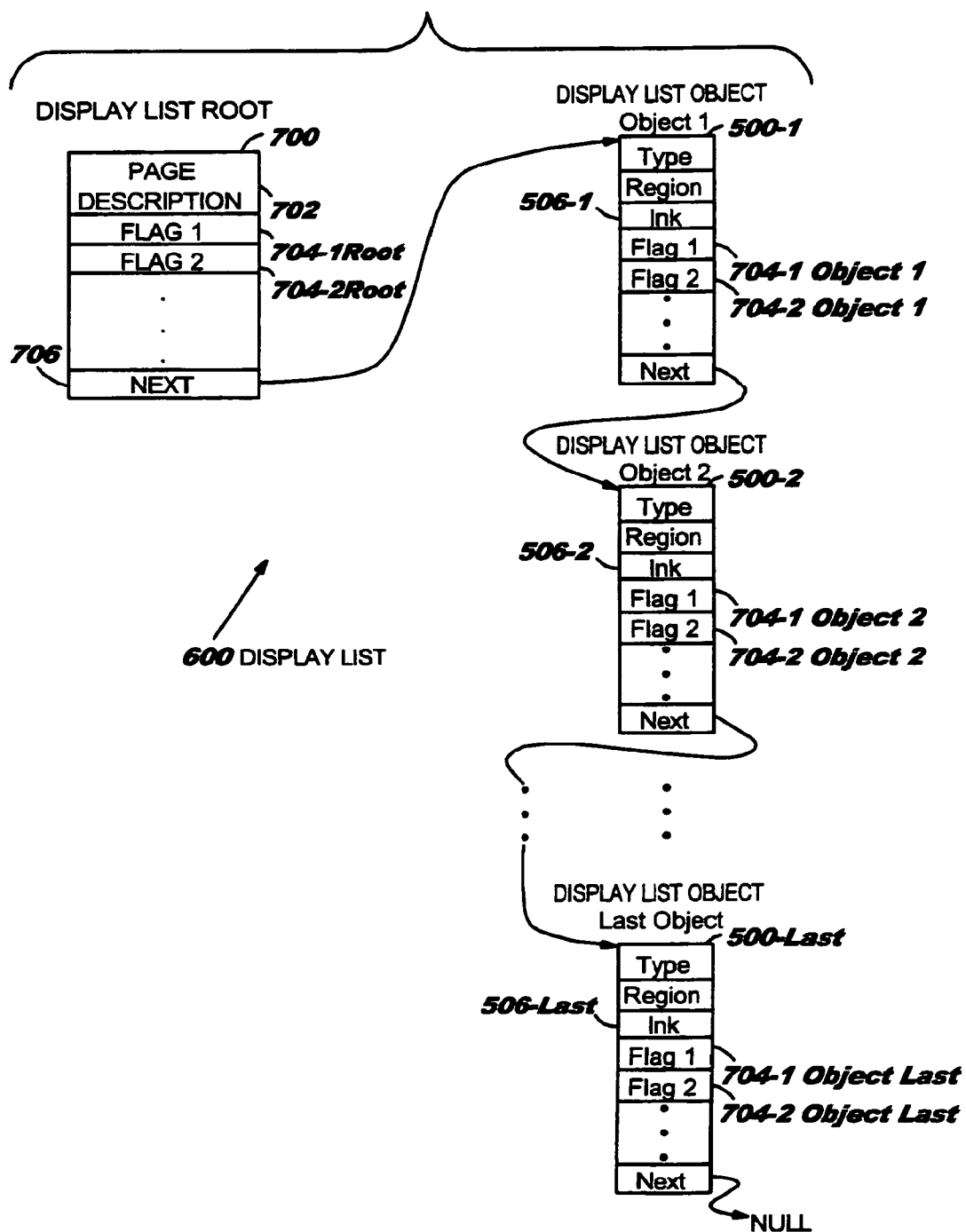
FIG. 10 is a diagrammatic view in accordance with the teachings of the present invention of another alternate embodiment of a display list having pluralities of objects and a root.

In still other embodiments, the flag 704 attribute is expanded to encompass multiple-flag situations. For example, in FIG. 8, one flag 704-1 might become set or not if a math or logic function has two or more inputs while a second flag 704-2 might become set or not for another reason. Of course, there is no limit to the number of flags that might become set or the criteria or condition for setting them. In still another embodiment, in FIG. 9, single flag situations could appear as individual attribute(s) 704-Object 1, 704-Object 2, 704-Object Last of display list objects 500-1, 500-2, 500-Last and may or may not be duplicated as a flag 704-Root on the display list root 700. In FIG. 10, a multiple-flag situation Flag 1, Flag 2, is depicted for each of the display list objects 500 and they may or may not be duplicated as a multiple-flag situation 704-1 Root, 704-2 Root on the display list root 700. Similar to the individual display list objects 500, the display list root 700 will also include a next pointer 706, not a substantive attribute of the to-be-printed page, which points to the first object on the display list 600. Of course, the root may also have more than one pointer as previously shown relative to the pointers of the display list objects. The very last next pointer for the last display list object points to a null set, void address or other to indicate no other objects of any type exist on the display list 600. Yet, in still other embodiments, the display list 600 may optionally include a display list ending (not shown) to which the last object points. The display list ending could be similar to the display list root and contain attributes or other for describing the physical or virtual to-be-printed page.

With reference to FIG. 11A, the decision for setting the flag attribute or not generally follows the process of assessing whether the ink attribute of individual display list objects 500-x include a hard processing operation or not. At step 1110, the graphics engine begins construction of the display list 600 by constructing display list objects 500 for each of the to-be-printed objects for a given to-be-printed page of a print job received as a PDL file. Appreciating that a time sequence is involved in the construction of the display list objects, when the graphics engine first begins construction, no object appears thereon. Thereafter, the graphics engine constructs the display list object for the first object and, at that time, the display list includes one object. After construction of the display list object for the second object, the display list includes two objects thereon, and so forth. Of course, the overall display list may already include the display list root 700 before construction of the first display list object. Eventually, the display list 600 becomes completed. Because of this time-wise construction of the display list, the determining of setting the flag attribute or not for the display list can occur contemporaneously with the construction of each object on the display list as shown generically as 1100. At step 1112, the graphics engine examines the ink attribute of the display list object for the first object and assesses, step 1114, whether it includes or contains a hard processing operation. If it does, the flag attribute becomes set for the entire display list, step 1116, and the process ends. In other embodiments (not shown), the setting of the flag attribute or not can occur at the completion of the construction of the entire display list, e.g., after all display list objects 500-1, 500-2 . . . 500-Last have been constructed. In still other embodiments, the setting of the flag or not can occur at any desirable time not limited to those mentioned. In any embodiment, the actual setting of the flag attribute or not can occur by simply toggling a single bit from a one to a zero, or vice versa, in the memory address(es) corresponding to the flag attribute 704 of the display list root 700. Alternatively, a flag attribute(s) can be set or not in any manner and still fall within the scope of the invention. Continuing with the flow chart, in the event the ink attribute, e.g., 506-1, for the display list object for the first object does not include a hard processing operation, the graphics engine and/or PDL emulator assesses whether any more to-be-printed objects from the PDL file exist that require construction or placing on the display list, step 1118. If other to-be-printed objects do exist that require construction, the graphics engine constructs them at step 1120. Then, the process of examining ink attributes, step 1112, assessing hard processing, step 1114, and setting the flag attribute, step 1116, repeats until no more to-be-printed objects exist. At such time, if the flag attribute, e.g., 704, of the display list root, e.g., 700, never becomes set at step 1116, the graphics engine maintains or keeps the flag attribute off or un-set for the entire display list. Those skilled in the art will appreciate, however, that the foregoing presumes the flag attribute is initially off or un-set. Conversely, other embodiments presume the reverse such that the flag is initially on or set and if the ink attributes 506-x for the collective display list objects 500-x never include or contain a hard processing operation, the flag could become un-set or turned off. The manner in which the flag attribute setting or un-setting occurs is a matter of design choice. Regardless of how the flag attribute becomes set or not, once the flag attribute is set at step 1116 for the entire display list, the graphics engine still constructs additional display list objects until all to-be-printed objects become placed on the display list. In other words, once the flag attribute becomes set for the entire display list, step 1116, the process of setting the flag attribute can end while the construction of additional display list objects continues.

Figure 11B:
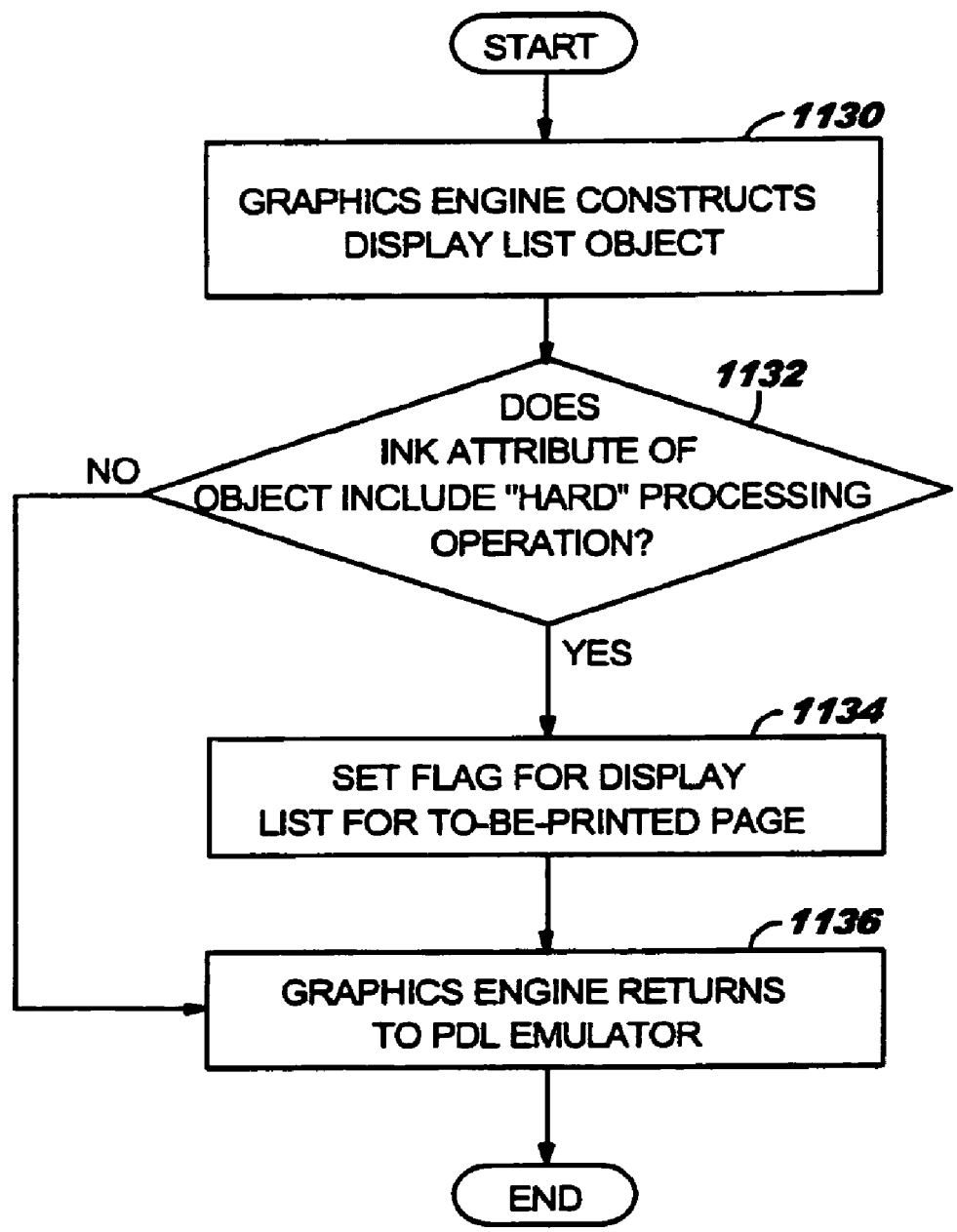
FIG. 11B is a flow chart in accordance with the teachings of the present invention of an alternate embodiment for setting a flag or not on a display list.

Appreciating the foregoing describes an overall flow for setting the flag attribute or not in accordance with the interaction between both the graphics engine and the PDL emulator, FIG. 11B shows the flow solely within the graphics engine. In such instance, the graphics engine constructs a display list object at step 1130. At step 1132, it assesses whether the ink attribute of the object includes a hard processing operation or not. If it does, the graphics engine sets the flag for the entire display list, step 1134, and returns to the PDL emulator, step 1136, and waits as necessary for additional information. If the ink attribute does not include a hard processing operation, the graphics engine goes straight to step 1136. Regardless of what structure set the flag attribute or not for the display list 600, the next processing path taken by the graphics engine in accomplishing the rendering of to-be-printed objects into device specific pages, as required at step 412 (FIG. 4), occurs in accordance with whether or not the flag attribute is in fact set or not.

Figure 12:
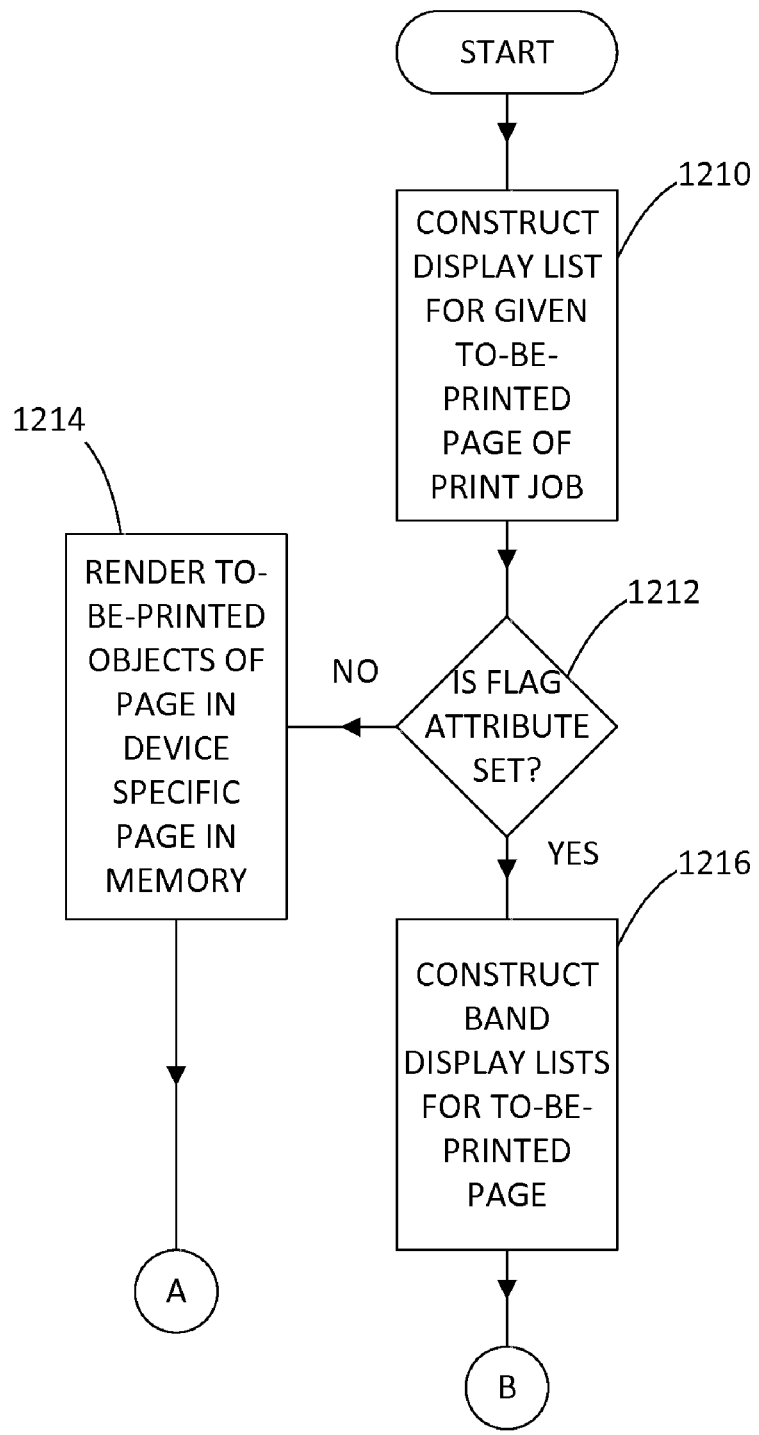
FIG. 12 is a flow chart in accordance with the teachings of the present invention of the processing that occurs when a flag attribute of a display list is set or not.

With reference to FIG. 12, the graphics engine constructs the display list 600 for all to-be-printed objects of a given to-be-printed page of a print job, step 1210. Skilled artisans will understand that this step may include the construction of a single or multiplicities of display list objects, the construction of a root and/or display list ending. Then, upon indication from the PDL file (via the PDL emulator) to print or "show-page," for example, the graphics engine examines the display list to see if the flag attribute 704 is set or not, step 1212. If the flag attribute remains off or un-set, the graphics engine then directly renders the to-be-printed objects into device specific pages in memory, step 1214. On the other hand, if the flag attribute is set, the graphics engine does not yet render the to-be-printed objects into device specific pages and, instead, constructs additional display lists for the to-be-printed page known hereafter as band display lists, step 1216.

In the situation where the graphics engine straight away renders the to-be-printed objects into device specific pages in memory, step 1214, the graphics engine renders the to-be-printed objects one at-a-time in memory in general accord with FIG. 13. At step 1310, the graphics engine examines the first display list object 500-1. At step 1312, the graphics engine ascertains the type 502-1 attribute of the to-be-printed object and, at step 1314, it ascertains the region 504-1 attribute. At step 1316, the graphics engine converts the colors (e.g., r, g, b) of the object into the device specific colors (e.g., CMYK) as previously described. Next, it performs well-known halftone operations for the to-be-printed object, step 1318, so it will appear properly to the human eye when viewed as a hard copy output. Of course the graphics engine may be assisted by other software or hardware structures to facilitate this step. There may even be instances where the graphics engine does not perform this step. At step 1320, the to-be-printed object becomes placed on the device specific page in memory. Then, at step 1326, memory addresses corresponding to that object, i.e., display list object 500-1, are released or freed so that the graphics engine or other structure can use them for future operations as necessary. If additional to-be-printed objects appear on the display list that require rendering (step 1326), the graphics engine repeats the process for the next to-be-printed object (steps 1328 and 1312-1324) until all to-be-printed objects are rendered in memory.

Figure 14A:
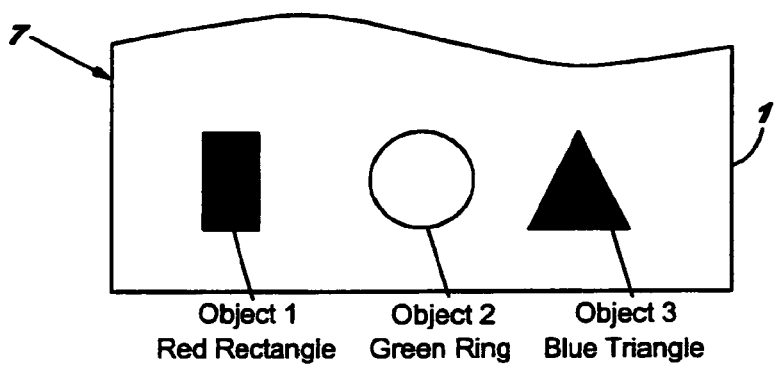
FIGS. 14A-14E are diagrammatic views in accordance with the teachings of the present invention of to-be-printed objects of a to-be-printed page of a print job.
Figure 14B:
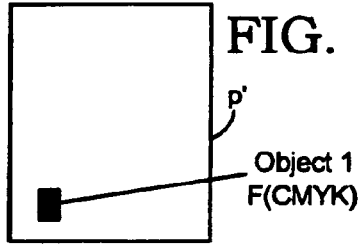
Figure 14C:
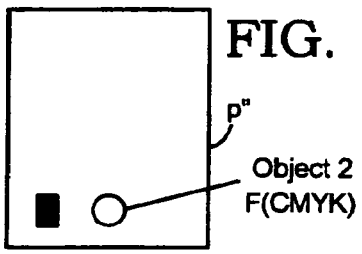
Figure 14D:
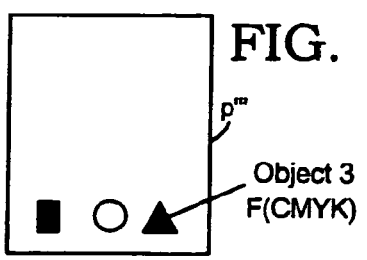
Figure 14E:
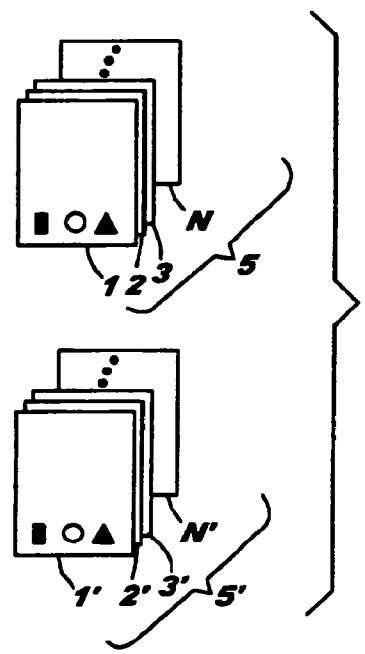

As a working example, reference is taken to FIGS. 14A-14D for objects of a hard copy sheet 1 of a given print job, especially a red (interior-filled) vertically oriented rectangle (object 1), a green ring with a white interior (object 2) and a blue (interior-filled) triangle (object 3), that reside in a non-overlapping fashion near a bottom 7 of sheet 1. As seen in FIG. 14B, the first object becomes placed on the device specific page in memory, step 1320, and it appears at the bottom left-hand corner of the memory page p'. It also has its color defined as a function of CMYK, not red, and is halftoned. In FIG. 14C, the first and second objects appear on the memory page p" after step 1320 occurs for object 2. Similarly, all three objects appear on the memory page p''' after the third iteration of step 1320 for the last object or object 3. At this point, the graphics engine can hand-off the bitmap, in device specific colors and halftoned, of the device specific page in memory P''' directly to the engine interface 216 (FIG. 2) to invoke the print mechanisms 218 of the printer 161 for producing a hard copy sheet. Of course, as seen diagrammatically in FIG. 14E, if additional to-be-printed pages, e.g., 2, 3 . . . N exist in a given print job 5, the graphics engine could wait until all to-be-printed pages became placed on device specific pages in memory, e.g., 2', 3' . . . N', before executing a hand-off to the engine interface.

Figure 15:
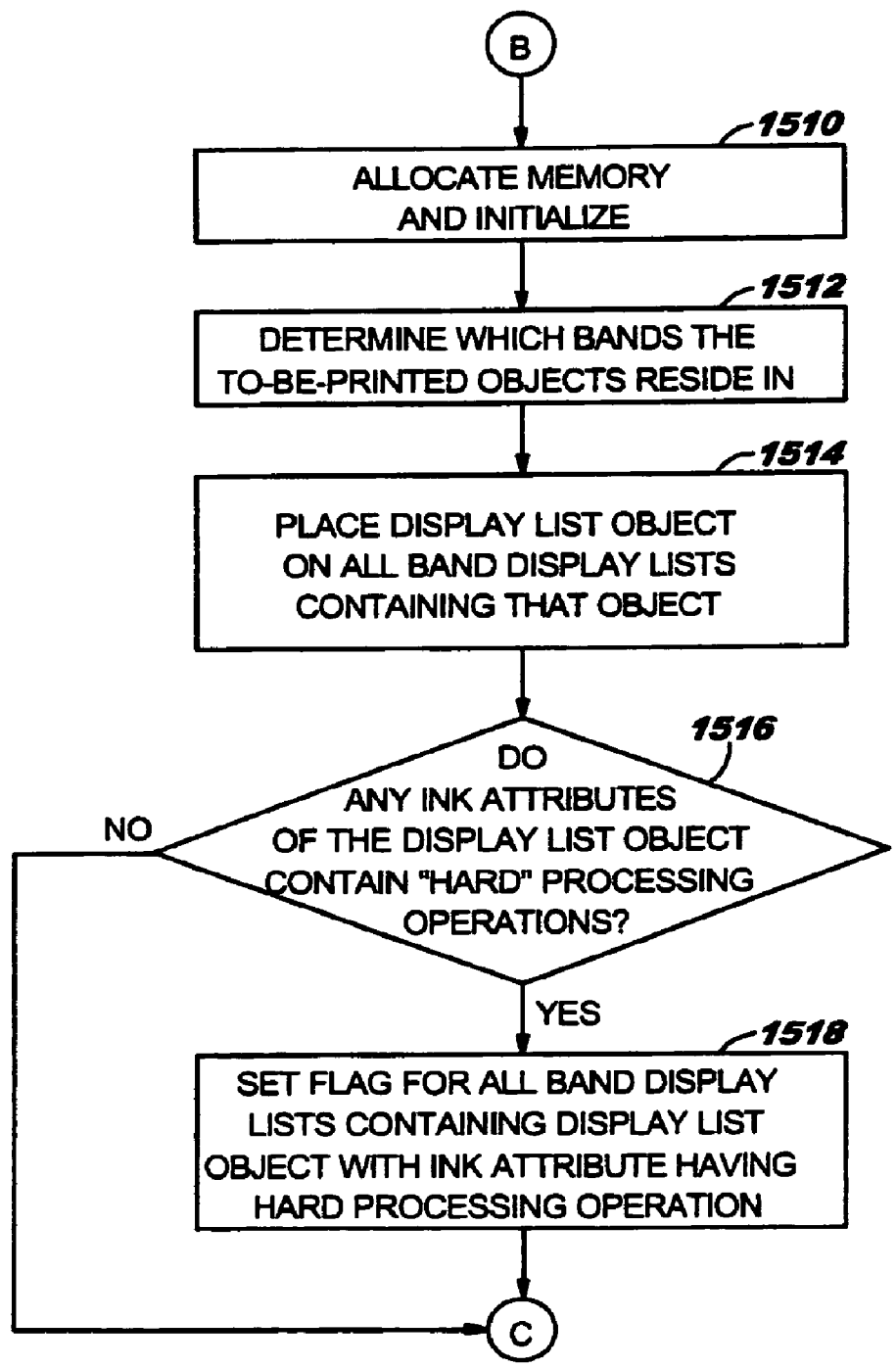
FIG. 15 is a flow chart in accordance with the teachings of the present invention of the processing that occurs after a display list for a to-be-printed page has its flag attribute set.
Figure 16A:
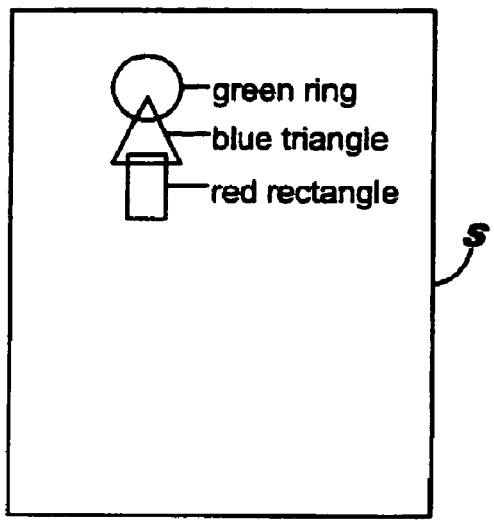
FIGS. 16A-16J are diagrammatic views in accordance with the teachings of the present invention of to-be-printed objects of a to-be-printed page and the bands associated therewith.
Figure 16B:
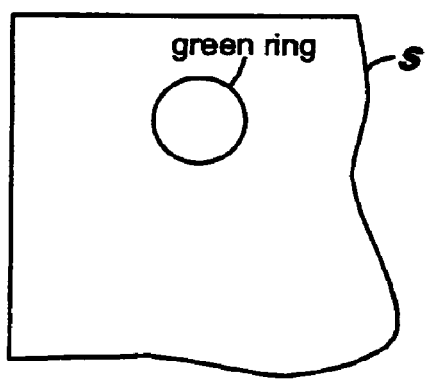
Figure 16C:
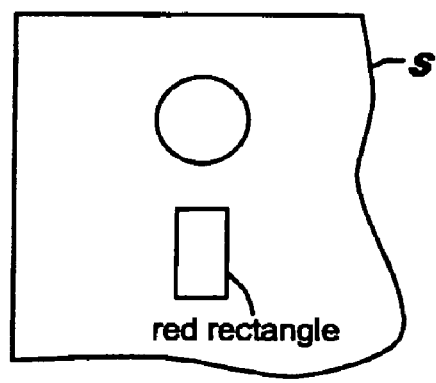
Figure 16D:
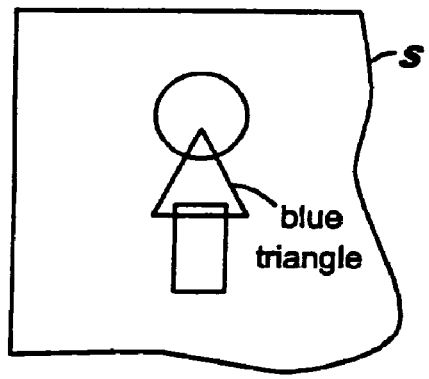

Corresponding to step 1216 (FIG. 12), the construction of band display lists for a to-be-printed page, of a given print job, having a flag attribute set for its corresponding display list, occurs in general accord with the flow chart of FIG. 15. Before then, however, consider the three previous to-be-printed objects of FIG. 14A arranged on a hard copy sheet S in a manner consistent with FIG. 16A. Specifically, the green ring is to-be-laid down on the sheet S first, FIG. 16B, followed by the red rectangle second, FIG. 16C, followed by the blue triangle third, FIG. 16D. Further, consider that the PDL file only specifies the blue-triangle object as having a hard processing operation. In turn, the ink attribute for the display list object corresponding to the blue triangle then causes the flag to become set in the display list root for the to-be-printed hard copy sheet S.

Figure 16E:
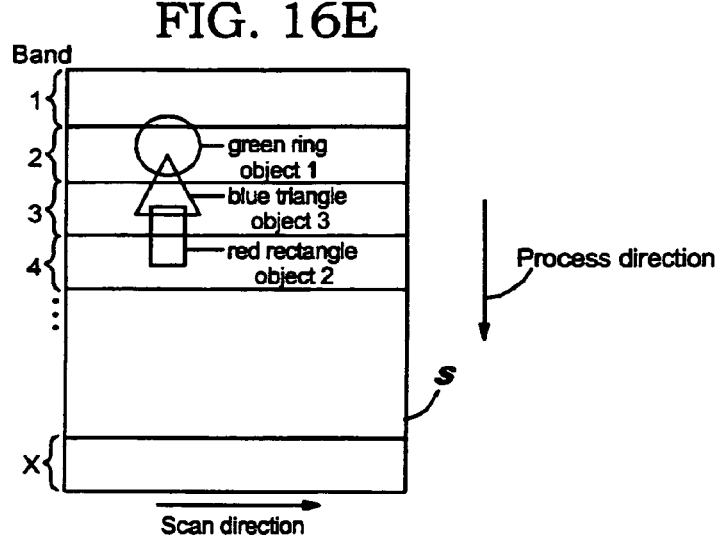
Figure 16F:
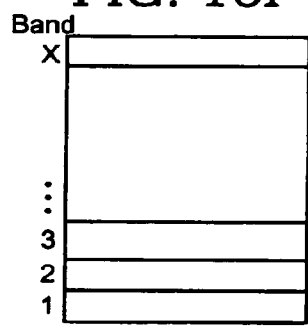
Figure 16G:
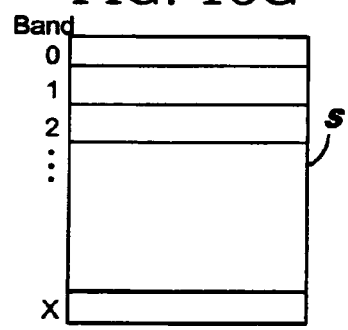
Figure 16H:
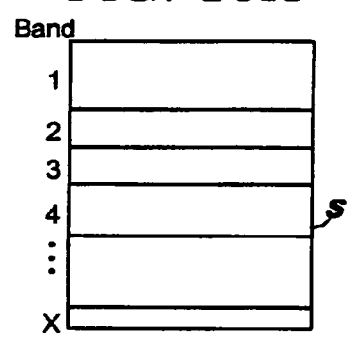
Figure 16I:
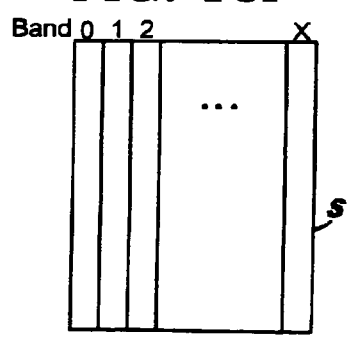
Figure 16J:
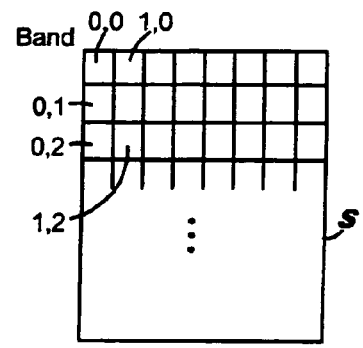
Figure 17:
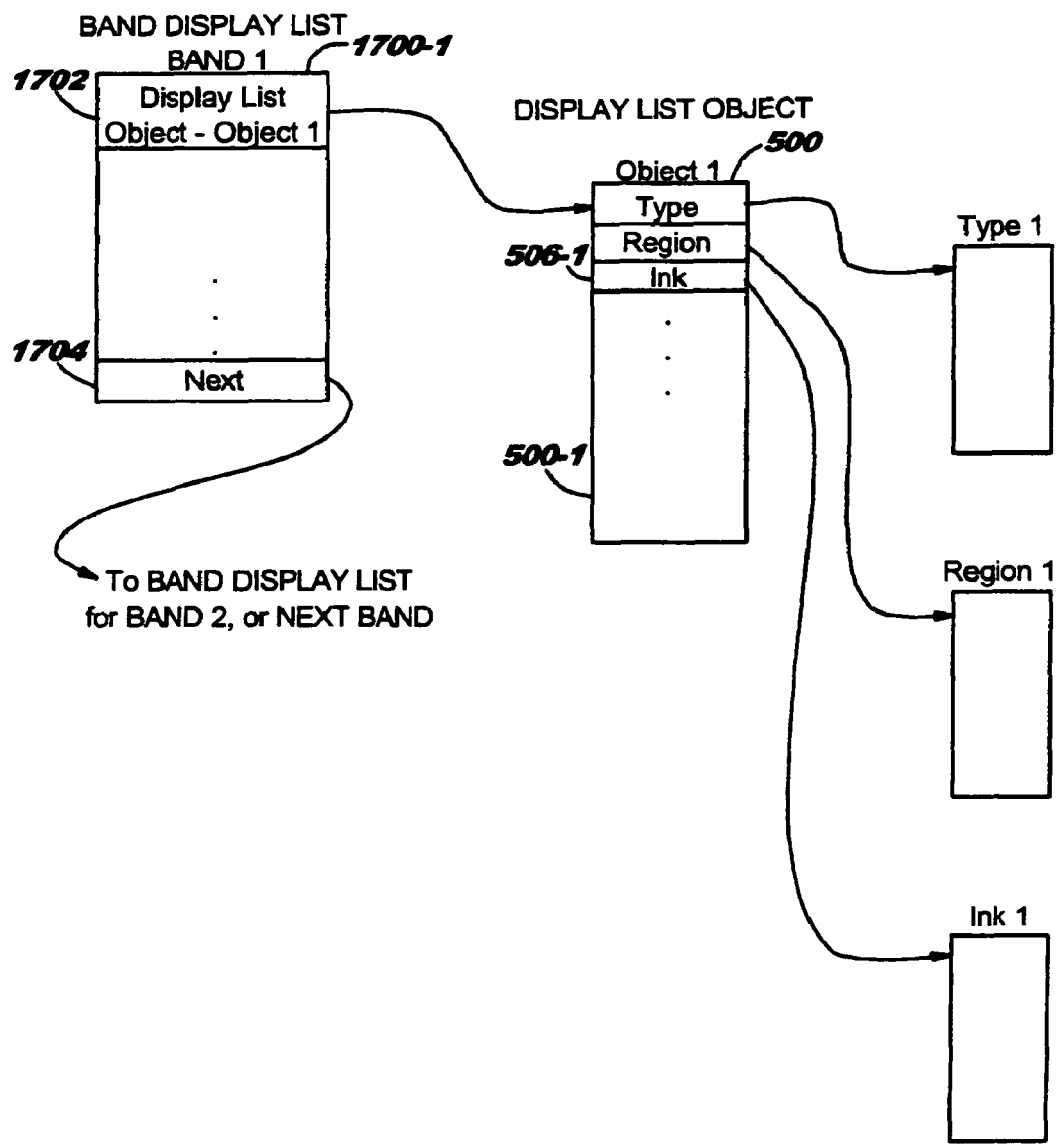
FIGS. 17-20 are diagrammatic views in accordance with the teachings of the present invention of various band display lists for the representative to-be-printed page example of FIG. 16E.
Figure 18:
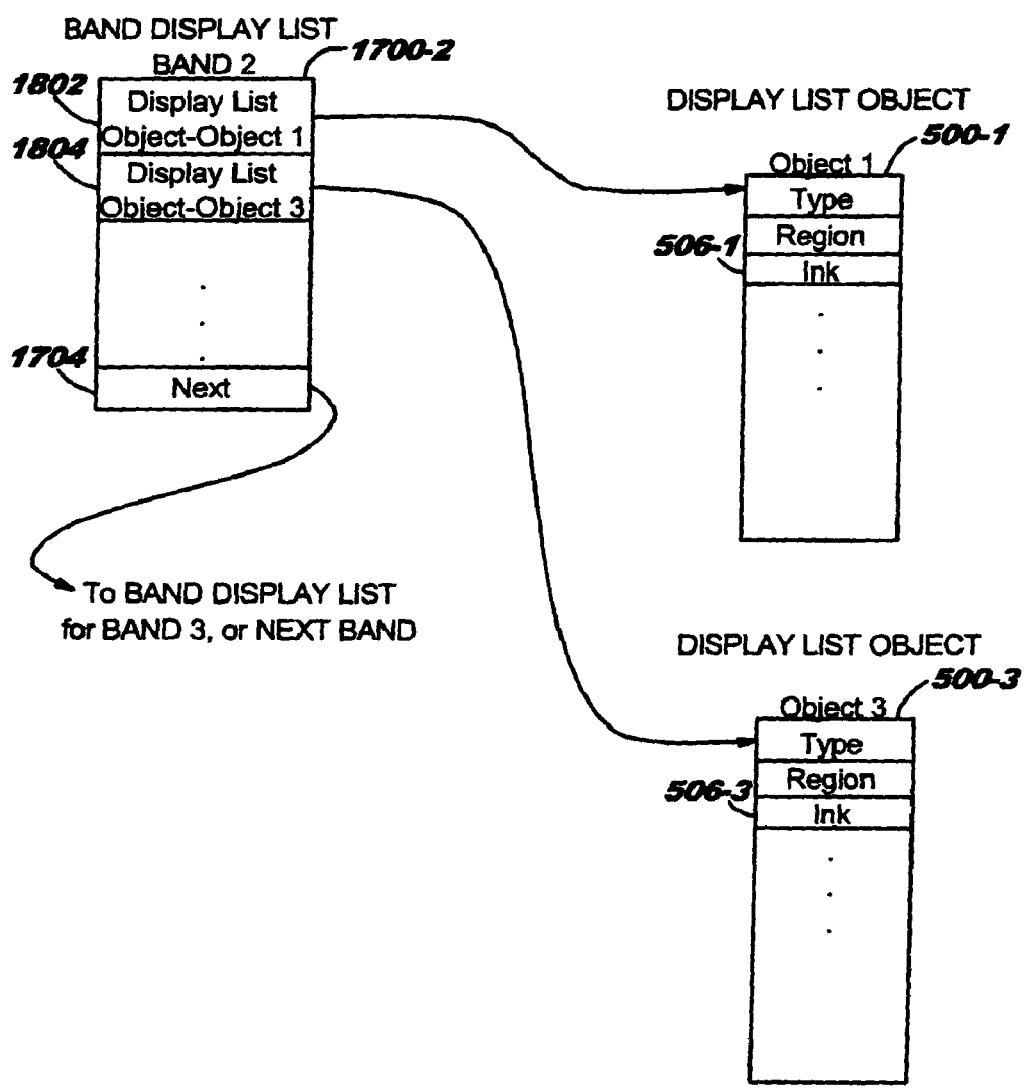
Figure 19:
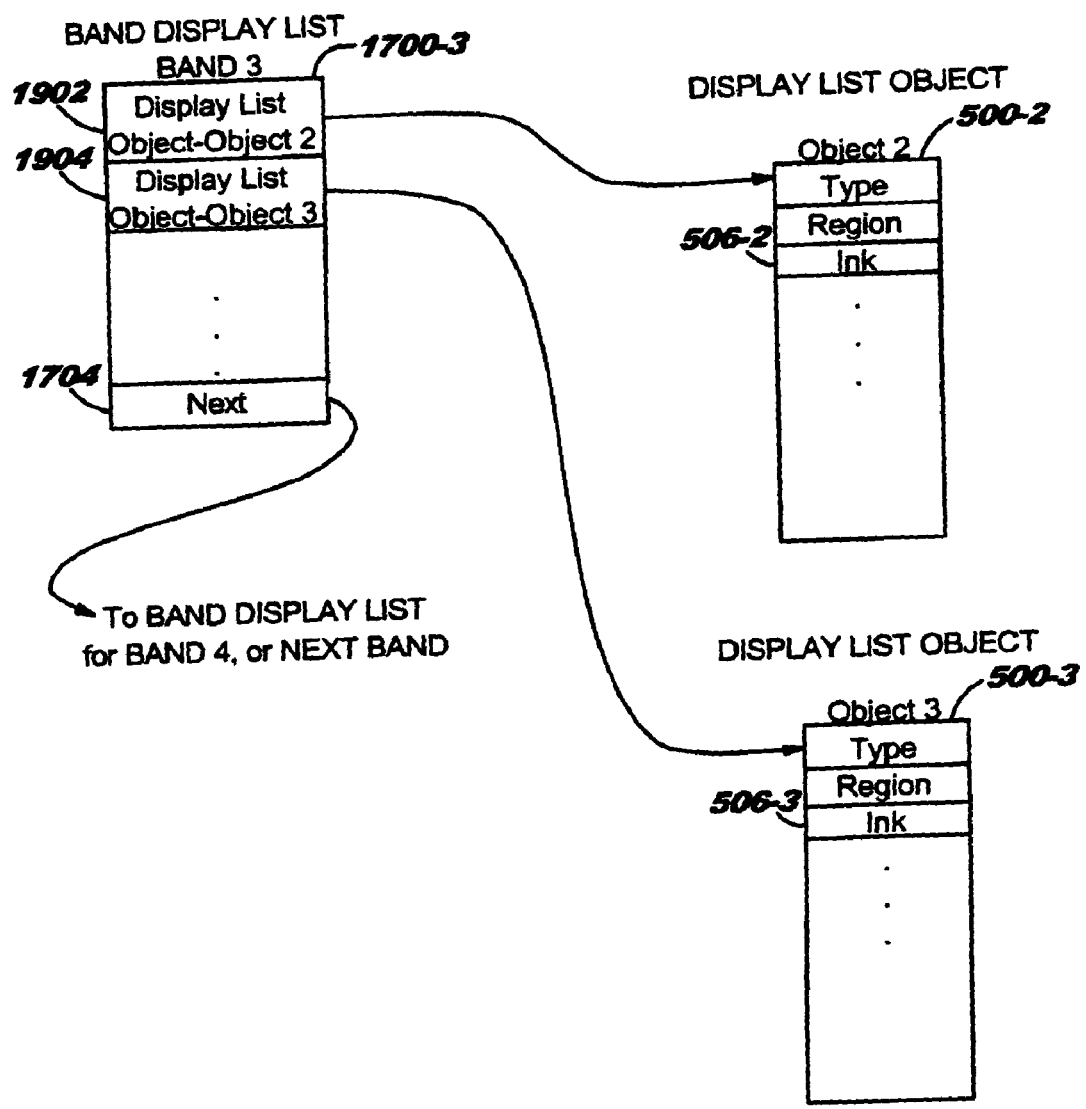
Figure 20:
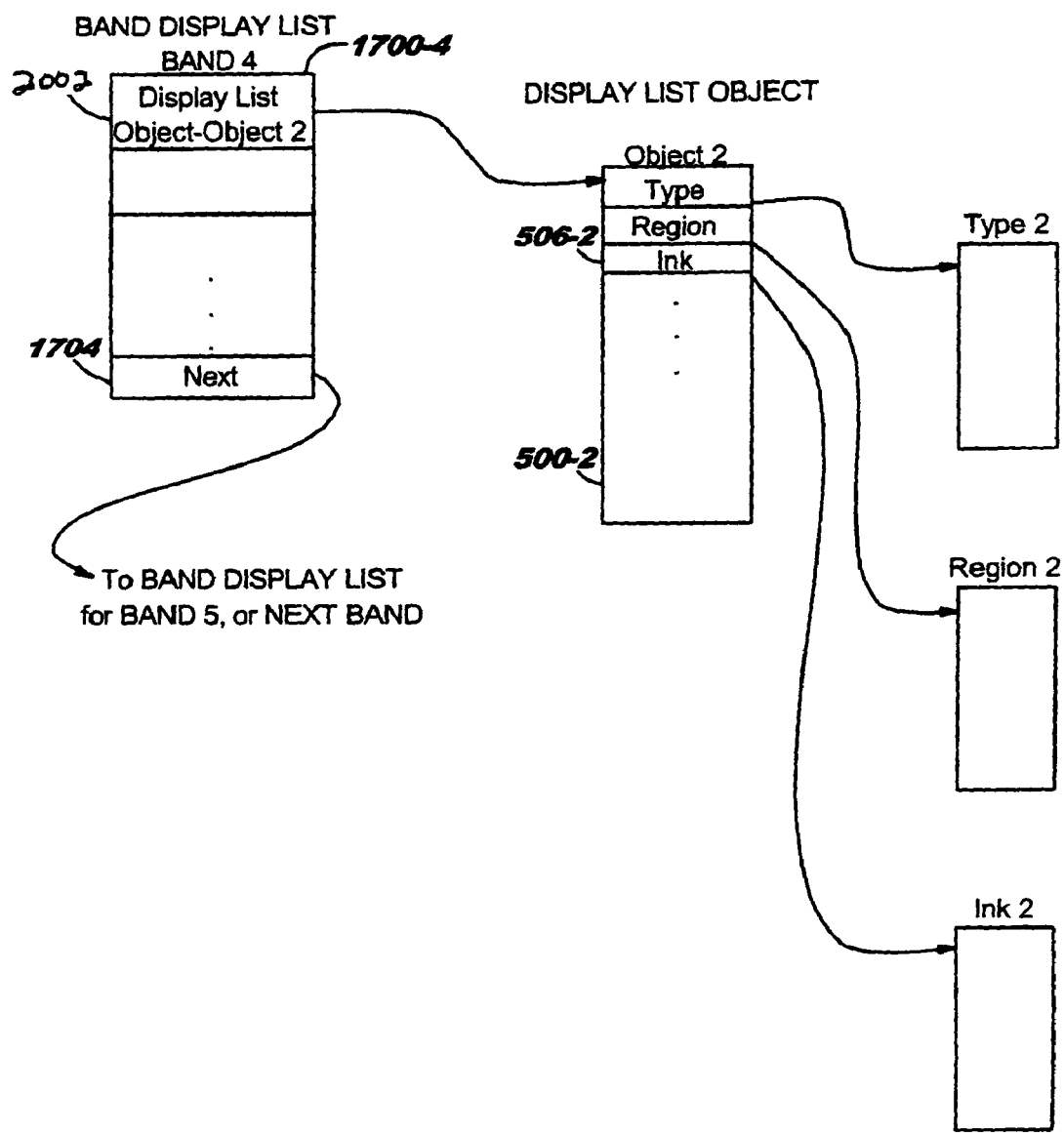

In FIG. 16E, pluralities of bands 1, 2, 3, 4 . . . X become allocated for and divide the to-be-printed page. Of course, the bands are located only in memory and do not physically divide a to-be-printed page as shown. The size of the bands have some maximum size of which its height and width are preferably set or fixed according to the maximum size, the resolution in dots-per-inch (dpi) of the printer and the size of the sheet, e.g., 8.5"×11", A4, etc. In one embodiment, the bands have a height in the process direction of approximately 13 scan lines tall. For an 8.5"×11" sheet in a printer having 600 dpi resolution, this equates to a total X of about 1000 bands. In other embodiments, the bands become allocated and numbered from the bottom of the sheet (FIG. 16F), become numbered beginning with band zero (FIG. 16G) or have a variable band height (FIG. 16H). In FIG. 16I, the bands exist in the scan direction while in FIG. 16J they exist in both the scan and process directions which results in blocks 0,0; 0,1; 1,0; 2,0; etc. Of course, any combination of the foregoing is also possible as are any other divisions of the to-be-printed page. Total band numbers X in the tens, hundreds, thousands or more are possible.

With reference to FIGS. 17-20, and continued reference to FIG. 16E, skilled artisans can observe that the green ring to-be-printed object resides in both bands 1 and 2. The to-be-printed blue triangle object resides in bands 2 and 3 while the to-be-printed red rectangle object resides in bands 3 and 4. As such a band display list (generically 1700-*y*; where y is the band number) in accordance with the invention would include display list objects (generically 500-*x*; where x is the to-be-printed object number) for to-be-printed objects that reside within a given band. In essence, the band display list comprises pluralities of data structures found in addresses or locations linked or blocked in memory, which together describe the to-be-printed objects of that particular band. Preferably, but not necessarily required, each of the band display lists are lists linked by a next pointer 1704 to other band display lists in an overall band display list and a root band display list precedes the band display list for the first band or band 1. Continuing the example, for band 1, the band display list of would exclusively include the display list object for the to-be-printed green ring object. The band display list for band 2 would include the display list objects for the to-be-printed green ring and blue triangle. The band display list for band 3 would include the display list objects for the to-be-printed blue triangle and red rectangle. The band display list for band 4 would exclusively include the display list object for the to-be-printed red rectangle. In a preferred embodiment, each individual band display list includes the display list objects in order of receipt from the PDL file as specified by the PDL emulator. In our example, if we call the to-be-printed green ring object, object 1, the red rectangle object, object 2, and the blue triangle object, object 3, because of the order specified by the PDL file in accordance with FIGS. 16B-16D for placing the objects on a sheet S, the band display list for band 1 (FIG. 17) then contains the display list object for object 1 only. For band 2 (FIG. 18), it contains the display list objects for objects 1 and 3. For band 3 (FIG. 19), it contains the display list objects for objects 2 and 3. For band 4 (FIG. 20), it contains the display list object for object 2 only. Of course, each band display list may additionally include other items thereon as indicated by ellipses above the next pointer 1704. Such other items may include information about the band size, how many total display list objects exist thereon or other. In another preferred embodiment, each display list object 500-$x$ on a band display list 1700-$y$ contains the entirety of the description of the to-be-printed object despite the object potentially overlying more than one band. In still other embodiments, the display list object becomes bifurcated amongst multiple band display lists such that only a description of the to-be-printed object of the display list object appears on the band display list for that portion that lies in that band. Skilled artisans can also contemplate other embodiments and remain within the scope of the invention.

Figure 21:
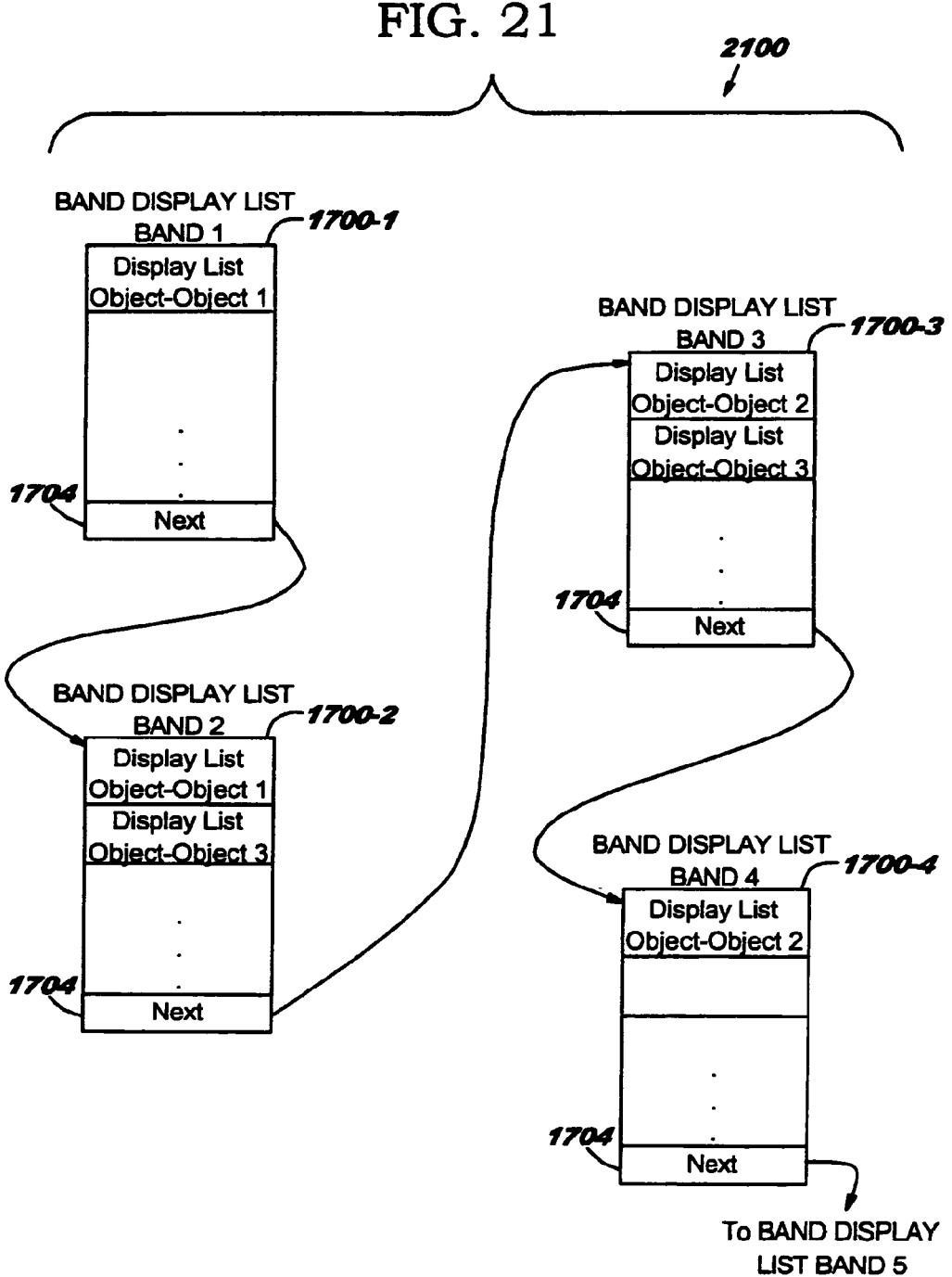
FIG. 21 is a diagrammatic view in accordance with the teachings of the present invention of an overall band display list for the band display lists of FIGS. 17-20.
Figure 22:
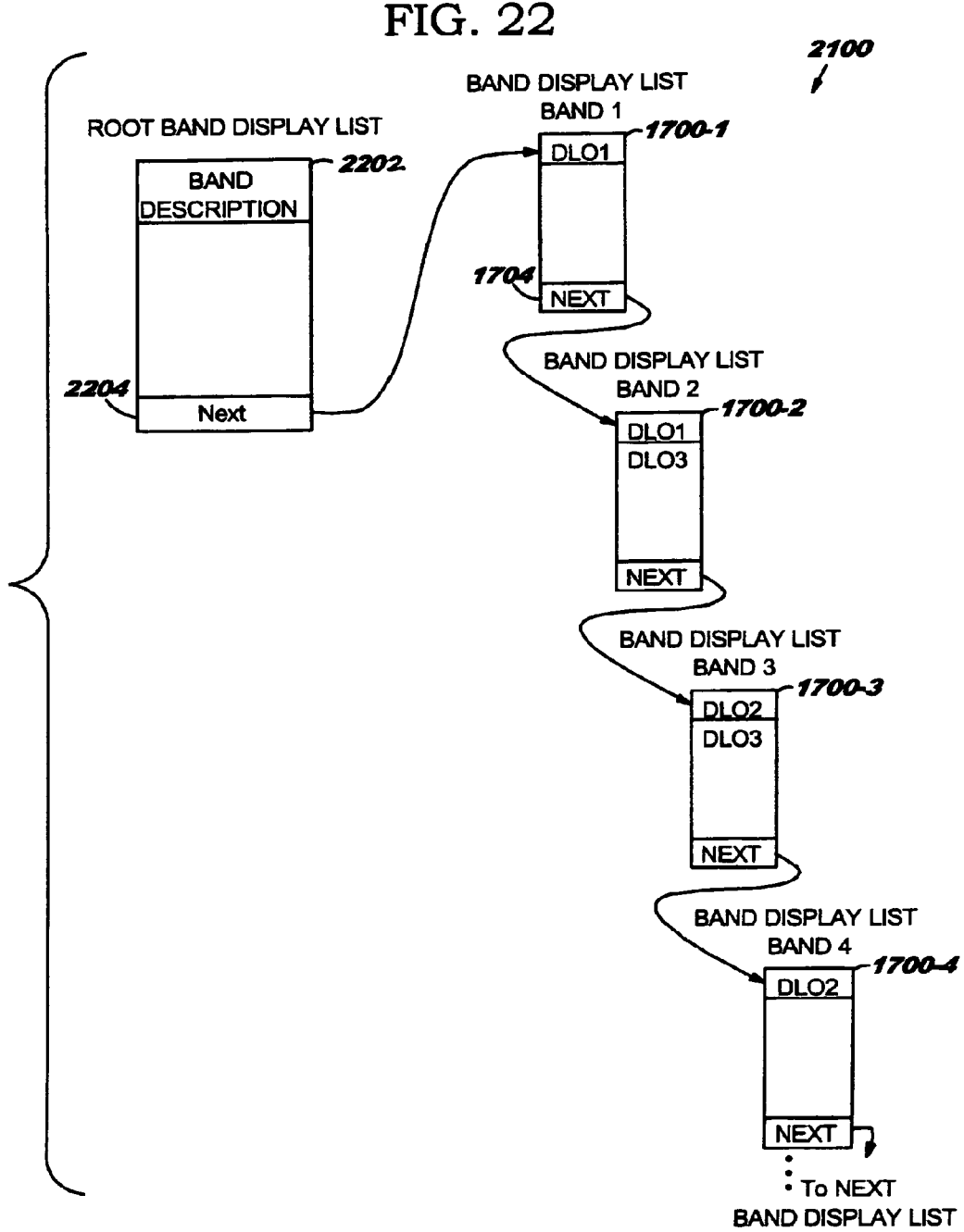
FIG. 22 is a diagrammatic view in accordance with the teachings of the present invention of the overall band display list of FIG. 21 with a root band display list.
Figure 23A:
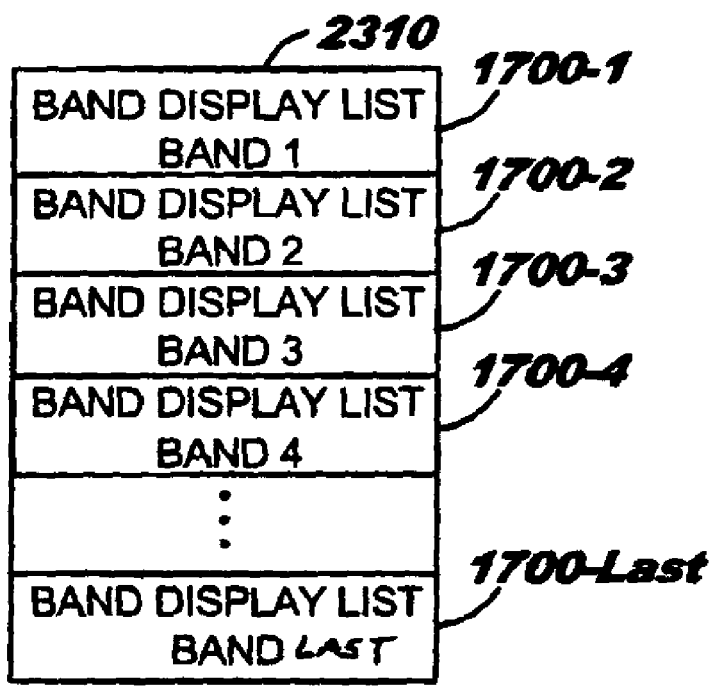
FIG. 23A is a diagrammatic view in accordance with the teachings of the present invention of an alternate embodiment of an overall band display list.

In FIG. 21, all of the individual band display lists 1700-$y$ (FIGS. 17-20) are depicted as linked together, via the functionality of next pointers 1704, on an overall band display list 2100. FIG. 22 shows the overall band display list 2100 with a root band display list 2200 preceding the first band display list 1700-1. In one embodiment, the root band display list 2100 includes a band description 2202 attribute for describing the band display lists that follow thereafter. In another embodiment, this attribute includes information about the size of the bands, whether they are fixed in size or not, how many bands exist and how they are numbered. Similar to the display list root 700, the root band display list 2200 includes a next pointer 2204, not an attribute of the overall band display list 2100, which points to the first band display list on the overall band display list 2100. In other embodiments, the overall band display list 2100 optionally includes an band display list ending (not shown) to which the band display list for the last band points. The band display list ending would be similar to the root band display list and contain attributes relative to the overall band display list 2100. In still other embodiments, the individual band display lists 1700-$y$ exist as stand alone locations in memory and have no links to other band display lists. For example, FIG. 23A shows the band display lists 1700-1, 1700-2, 1700-3, etc., allocated as a contiguous block of memory 2310 which eliminates the need for next pointers. The particular embodiment selected is a matter of design choice.

With reference to FIG. 15, the flow chart for constructing or building the band display lists in accordance with step 1216 of FIG. 12 can now be discussed. At step 1510, the graphics engine allocates appropriate memory and initializes all to a null set, for example. Preferably the memory is the dedicated memory M of the graphics engine 214 but it could also be any memory to which the graphics engine has access. Once the null set is constructed, the graphics engine then determines which bands have objects therein and which particular bands the to-be-printed objects reside in, step 1512. As will be described with reference to FIG. 24 below, this determination step may be accomplished through the use of bounding boxes. At step 1514, the graphics engine places the display list objects 500-$x$, for example, that correspond with the to-be-printed objects that reside in a given band on all band display lists containing that object. As in the previous example, object 2 can be found in each of bands 3 and 4 and, thus, the band display list 1700-3, 1700-4 for bands 3 and 4 each contain the display list object 500-2 for object 2. Similarly, object 3 can be found in each of bands 2 and 3 and, thus, the band display lists 1700-2, 1700-3 for bands 2 and 3 each contain the display list object for object 3. Again, it is preferred, but not required, to carry the entirety of the display list object 500-$x$ in each of the bands containing object x despite the object potentially overlapping and residing in more than one band. At step 1516, the graphics engine assesses whether any of the ink attributes 506-$x$ of the display lists objects 500-$x$ contain hard processing operations, as previously defined. If so, the graphics engine sets a flag for all band display lists 1700-$y$ containing that display list object 500-$x$ with the ink attribute 506-$x$ having a hard processing operation, step 1518.

Figure 23B:
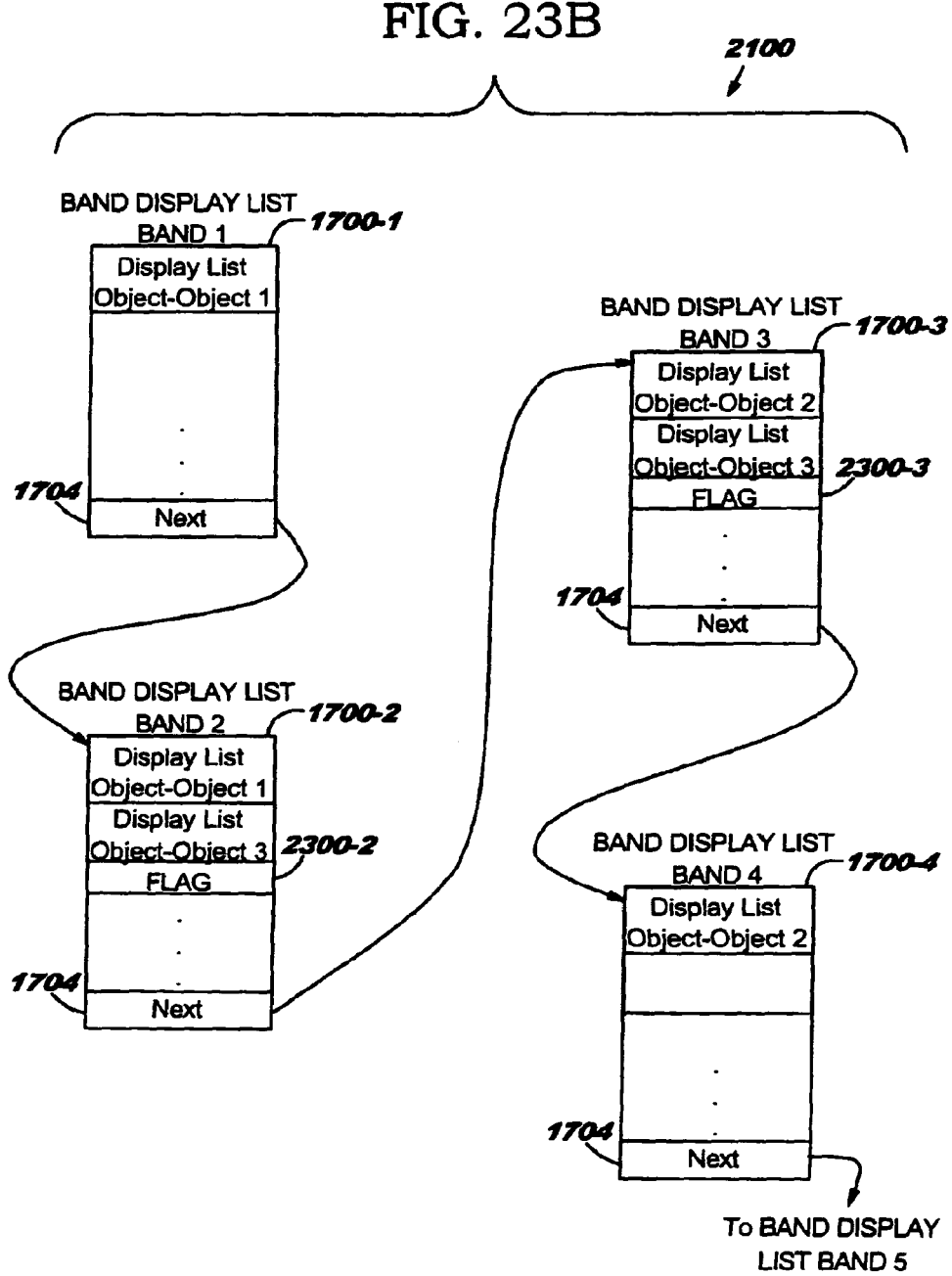
FIG. 23B is a diagrammatic view in accordance with the teachings of the present invention of an overall band display list showing set flags for the representative to-be-printed page example of FIG. 16E.

In the example from above, only the blue triangle, object 3, in bands 2 and 3 has an ink attribute containing hard processing. Thus, an overall band display list 2100 with flags 2300 set in all band display lists containing object 3 corresponds to band display lists 1700-2, 1700-3 having a flag 2300-2, 2300-3 set as seen in FIG. 23B. Of course, the flags 2300 of the band display lists may also function according to the embodiments previously described for the display list objects and root and may include single or multiple flag situations. The flags 2300 may also relate to hard processing operations in attributes other than or in addition to the ink attribute of the display list object. The flags 2300 may alternatively indicate any other criteria useful in indicating the presence or absence, the on or off, or other of a "condition" in any of the display list objects or band display lists. The condition may likewise reside in an attribute of the object other than or in addition to the ink attribute.

Figure 24:
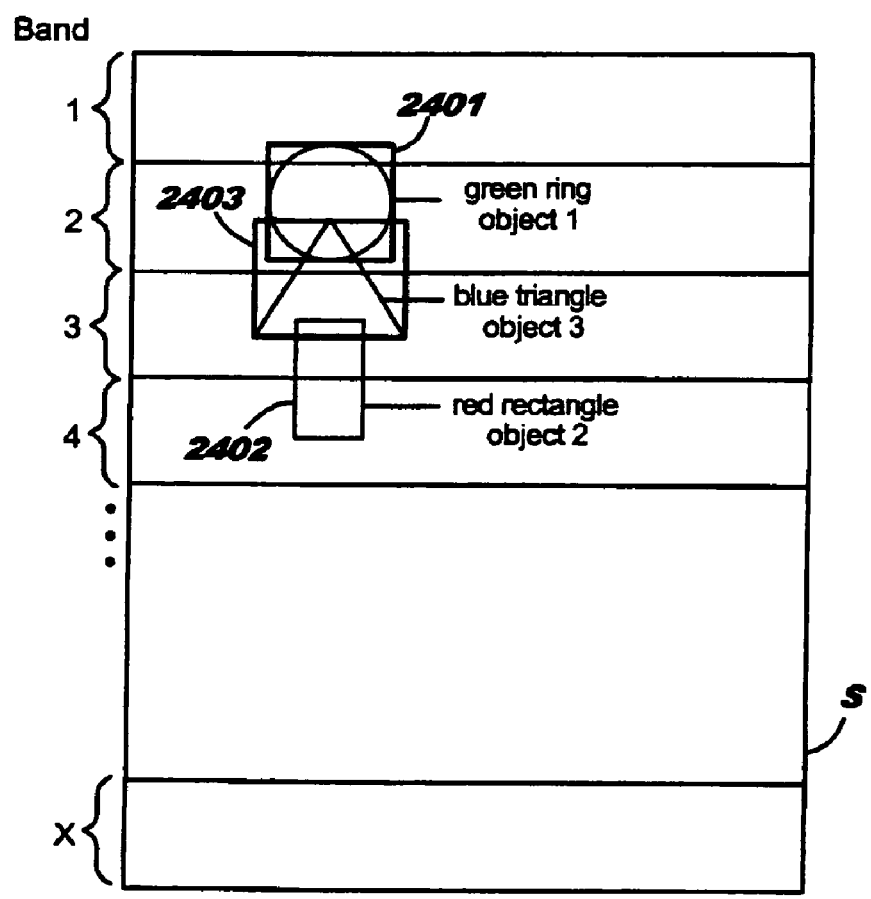
FIG. 24 is a diagrammatic view in accordance with the teachings of the present invention of bounding boxes around to-be-printed objects.

With reference to FIG. 24, each of the to-be-printed objects in a given to-be-printed page S may additionally be bound with a bounding box, such as boxes 2401, 2402, 2403. In this manner, when the graphics engine determines in what bands the to-be-printed objects reside in, as in step 1512, the graphics engine can do so by determining in what bands the bounding boxes reside in. Skilled artisans will appreciate that many to-be-printed objects have extremely complex regions that can greatly complicate the determination of which bands the to-be-printed objects reside in and bounding boxes will greatly simplify this task.

Figure 25:
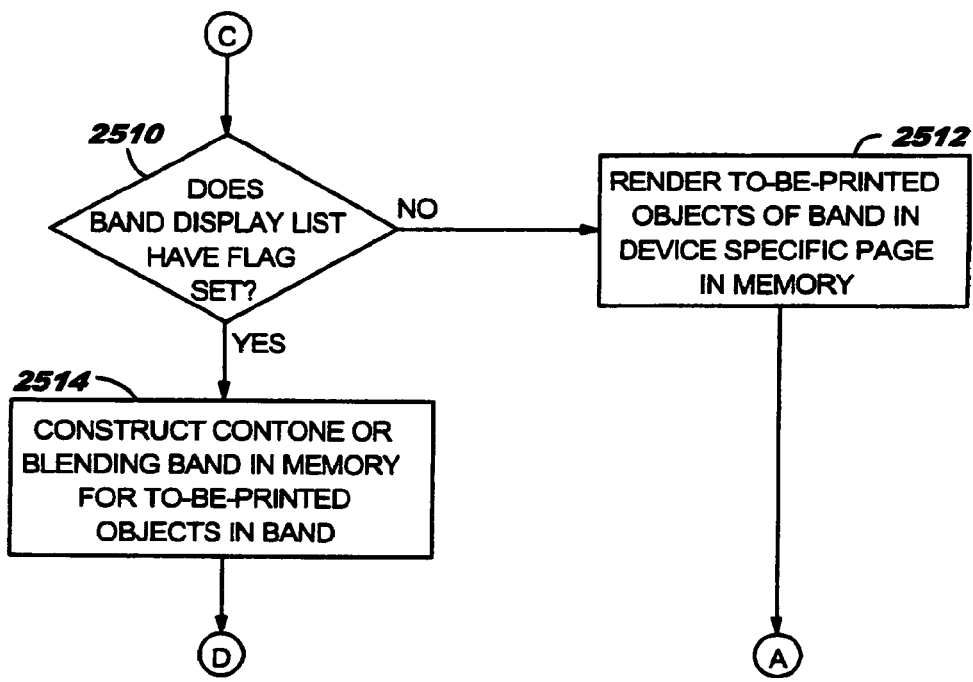
FIG. 25 is a flow chart in accordance with the teachings of the present invention of processing done on band display lists having flags set or not.

With reference to FIG. 25, once the graphics engine sets the flags (e.g. 2300) or not of the various band display lists, the graphics engine needs to determine which bands have flags set and which do not. In this manner, it can later process bands with flags set in their corresponding band display list in one way and process bands without flags set in their corresponding band display list in another way. Specifically, at step 2510, the graphics engine determines whether a band display list for a given band has a flag set. Of course, this step can occur simultaneously with the construction of the band display lists or may occur after the completion of the overall band display list 2100 whereupon the graphics engine then traverses the entirety of the overall band display list looking for bands having flags set or not in their respective band display lists. If the band does not have a flag set in its corresponding band display list (e.g., 1700-$y$), the graphics engine then renders the to-be-printed objects found in that band into a device specific page in memory, step 2512.

In a preferred embodiment, this occurs in the same general manner as the rendering in FIG. 13. Bear in mind, if the band display list for a given band does not have its flag set, then all to-be-printed objects in that band do not require any hard processing operations within their ink attribute and the processing of these to-be-printed objects can occur in the same general manner as the to-be-printed objects of FIG. 13 found on a to-be-printed page having no flag set for the entirety of the to-be-printed page. Of course, the flow chart of FIG. 13 becomes modified slightly because object 1 with display list object 500-1, step 1310, may or may not be found in the band being rendered. In such instances, the rendering occurs for the first object having a display list object and then the second object having a display list object, etc., until all objects within the band become rendered.

Figure 26:
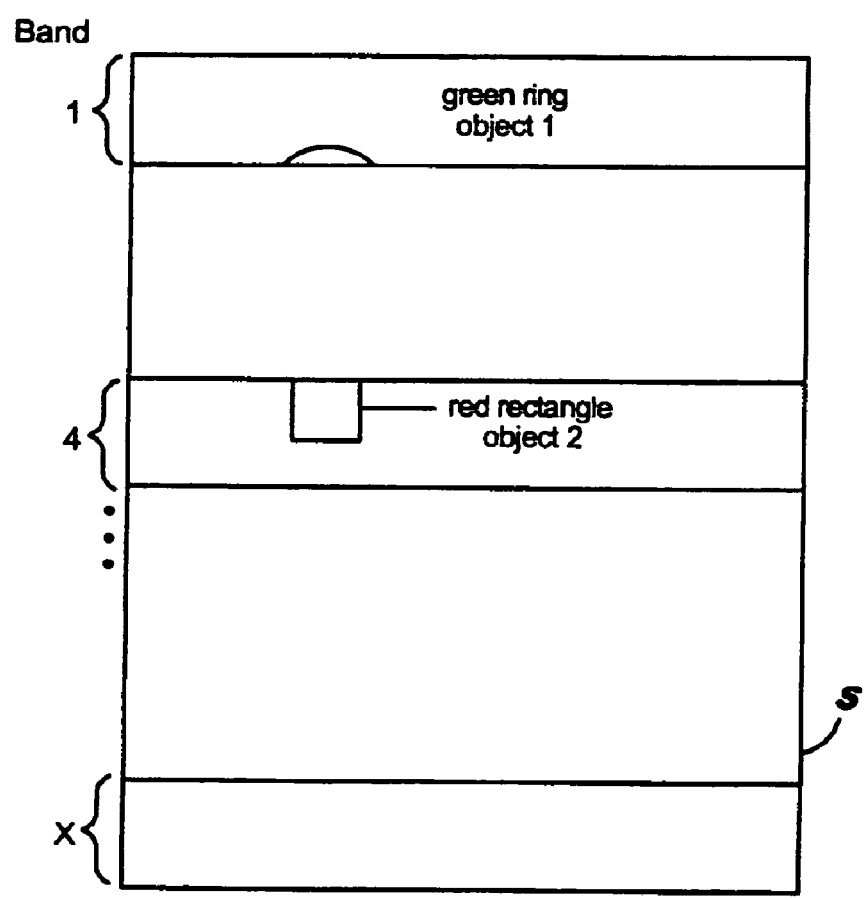
FIG. 26 is a diagrammatic view in accordance with the teachings of the present invention of a partially processed device specific page in memory.

With reference to FIG. 26, skilled artisans will appreciate that rendering in accordance with step 2512 (FIG. 25) for any given device specific page in memory S' corresponding to a to-be-printed sheet S (FIG. 16) will stop or become clipped upon the reaching the boundaries or end of a band. For example, and continuing the previous example, bands 1 and bands 4 do not contain band display lists (e.g. 1700-1 and 1700-4) with a flag set. Thus, when rendering the device specific page S' in memory for those two bands, the result will only have rendering in those bands despite the fact that the to-be-printed objects overlap into other bands. Bands 2 and 3, in contrast, do have band display lists (e.g. 1700-2, 1700-3) with flags set (because object 3 contains hard processing operations in its ink attribute) and will follow a separate rendering path described below. Meanwhile, the bands between 4 and X can either be rendered as a blank page or carried as bands having no to-be-printed objects therein. In either event, the processing for these bands, as well as bands 1 and 4, is now complete and ready for hand-off from the graphics engine to the engine interface of the printer. Preferably, the graphics engine waits until bands 2 and 3 become processed before effectuating this hand-off.

With reference again to FIG. 25, in the event the band does have a flag set for its corresponding band display list (e.g., 1700-2, 1700-3), the graphics engine constructs a contone (continuous tone) or blending band in memory for the to-be-printed objects in that band, step 2514. Again, the contone band is a way to losslessly represent color information of an original application from whence the PDL originates. As for the particular order whether the graphics engine performs steps 2512 or 2514 first or second, either can occur first. They can even occur substantially simultaneously. Bands of the same type, i.e., those with flags set or those without flags set, can also have simultaneous or sequential processing done. Regarding the construction of the contone band, it will occur in memory generally as a derivation of a contone page stored in memory (graphics engine dedicated memory M or elsewhere).

Figure 27:
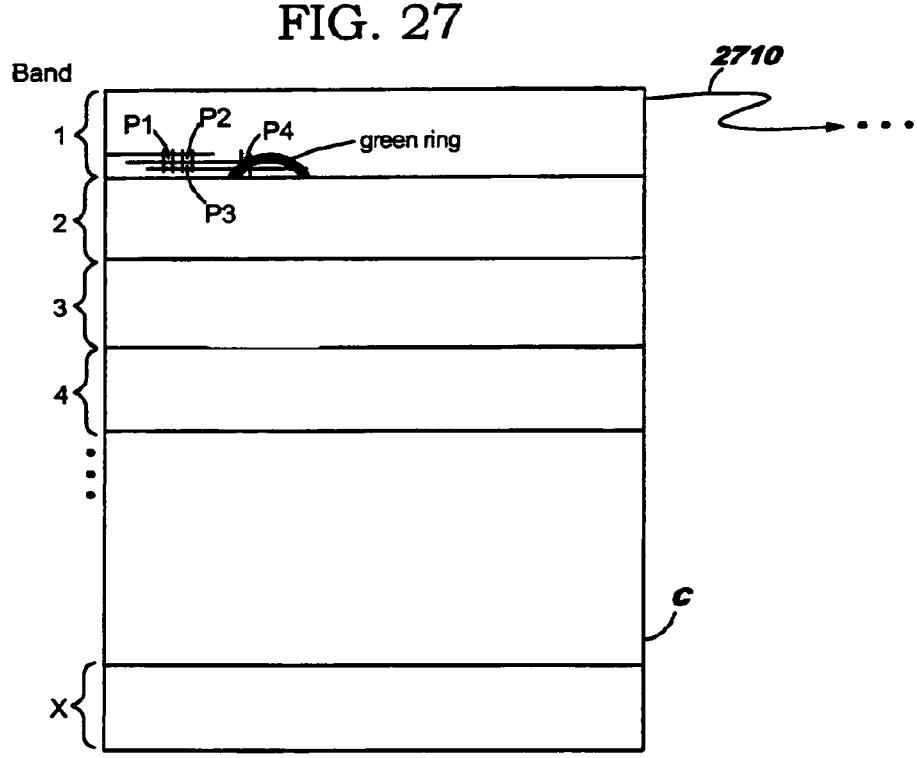
FIG. 27 is a diagrammatic view in accordance with the teachings of the present invention of a representative contone page.

In turn, the contone page is a data structure constructed by the graphics engine before, during or after the construction of the band display lists and it generally parallels the device specific page, e.g., S', in height and geometry. It may differ from the device specific page, however, in its number of color planes and plane bit depth. Preferably, the contone page losslessly holds color information, pixel-by-pixel, about to-be-printed objects on a to-be-printed page in a given print job. To construct it, the graphics engine utilizes information or data from the display list objects. The diagrammatic appearance of the contone page C in memory is illustrated in FIG. 27. It includes bands 1, 2, 3, 4 . . . X with one or more pointers 2710 pointing to memory addresses 2712, 2714, 2716, 2718 that contain eight bits of color information, per each color plane, e.g., three color planes r, g, b, for each and every pixel P in the band. However, the memory addresses need not be contiguous or sequential as shown. Also, although each and every band contains pixels, for simplicity, only band 1 is shown as having them and only a few pixels P1, P2, P3, P4 are depicted in a greatly exaggerated state. The portion of the green ring, from our previous example, residing in band 1 is superimposed on the contone page so that skilled artisans will notice the difference in color information in the contone page for pixel P4, embodying green color information, as compared to pixels P1, P2, P3 which represent no to-be-printed objects, or the underlying white sheet of to-be-printed paper. As is known, white in r, g, b, space for these pixels corresponds to 1.0, 1.0, 1.0, where r, g, b values can range between 0.0 and 1.0 with 0.0 meaning lack of a particular colorant and 1.0 meaning full colorant (in eight bit binary representation this is 11111111, 11111111, 11111111).

Figure 28A:
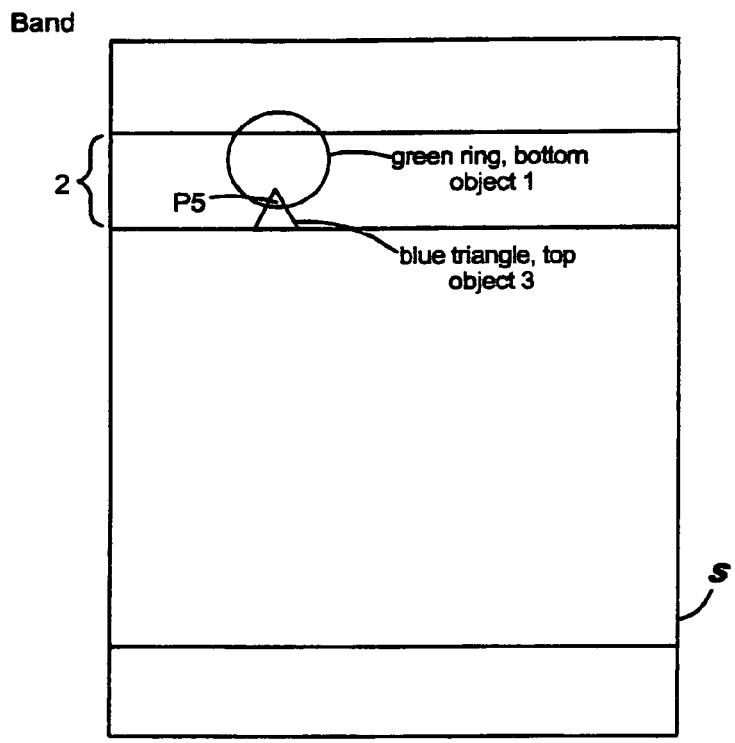
FIGS. 28A-28C are diagrammatic views in accordance with the teachings of the present invention of the blending operations to create a contone band.
Figure 28B:
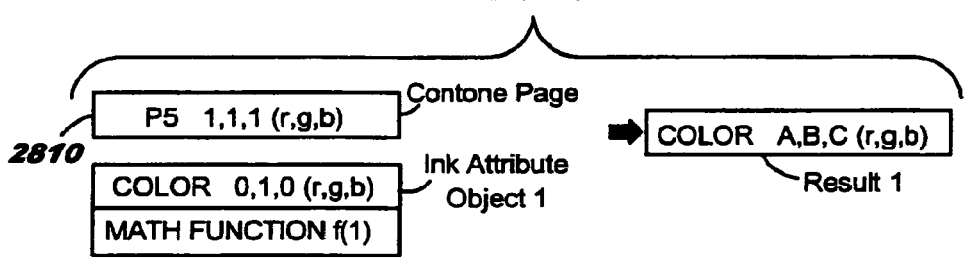
Figure 28C:
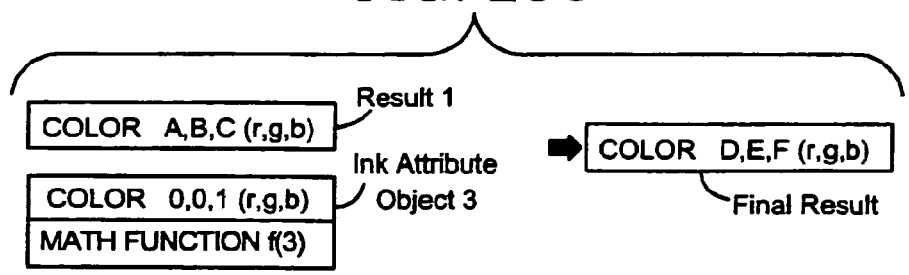

With reference to FIGS. 28A-28C, the rendering of bands with band display lists having a flag set therein occurs generally in accordance with the following example. Consider the first band having a flag set in its band display list. In our example, this corresponds to band 2 having a band display list 1700-2 with flag 2300-2 set (FIG. 23B). In turn, this band display list includes the display list objects 500-1, 500-3 (in this order) for object 1, green ring, and object 3, blue triangle. As you will recall, the contone page for this band, band 2, includes a pixel-by-pixel representation of the entire band. Since the ink attribute 506-$x$ in each of the display list objects also includes color information for the entire to-be-printed objects 1, 3 (green ring and blue triangle), the pixels of the contone page become blended with the color information of the ink attributes of the objects 1, 3. The blending occurs in accordance with the math or logic function defined for that ink attribute as specified in accordance with the PDL file presently being used. The math or logic functions are well known in the art.

As an example, consider pixel P5 in band 2. The contone page representation for this pixel 2810 (FIG. 28B) first embodies the white paper on which objects 1 and 3 become placed. The ink attribute for object 1 corresponds to 0, 1, 0 (r, g, b). The math or logic function is some specified function, f(1). Upon blending, a color value A, B, C (in r, g, b color space) results. For convenience, this is Result 1. Then (FIG. 28C), the color of Result 1 is blended with the color of object 3 in accordance with object 3's specified math or logic function f(3). The result of this operation then produces the Final Result color information. The compilation of all such pixels for this band embodies the contone band. Of course, if additional to-be-printed objects existed in the band, this process would continue. In a similar manner, band 3 (not shown) becomes a contone band 3 for the red rectangle and the overlying blue triangle.

Figure 29:
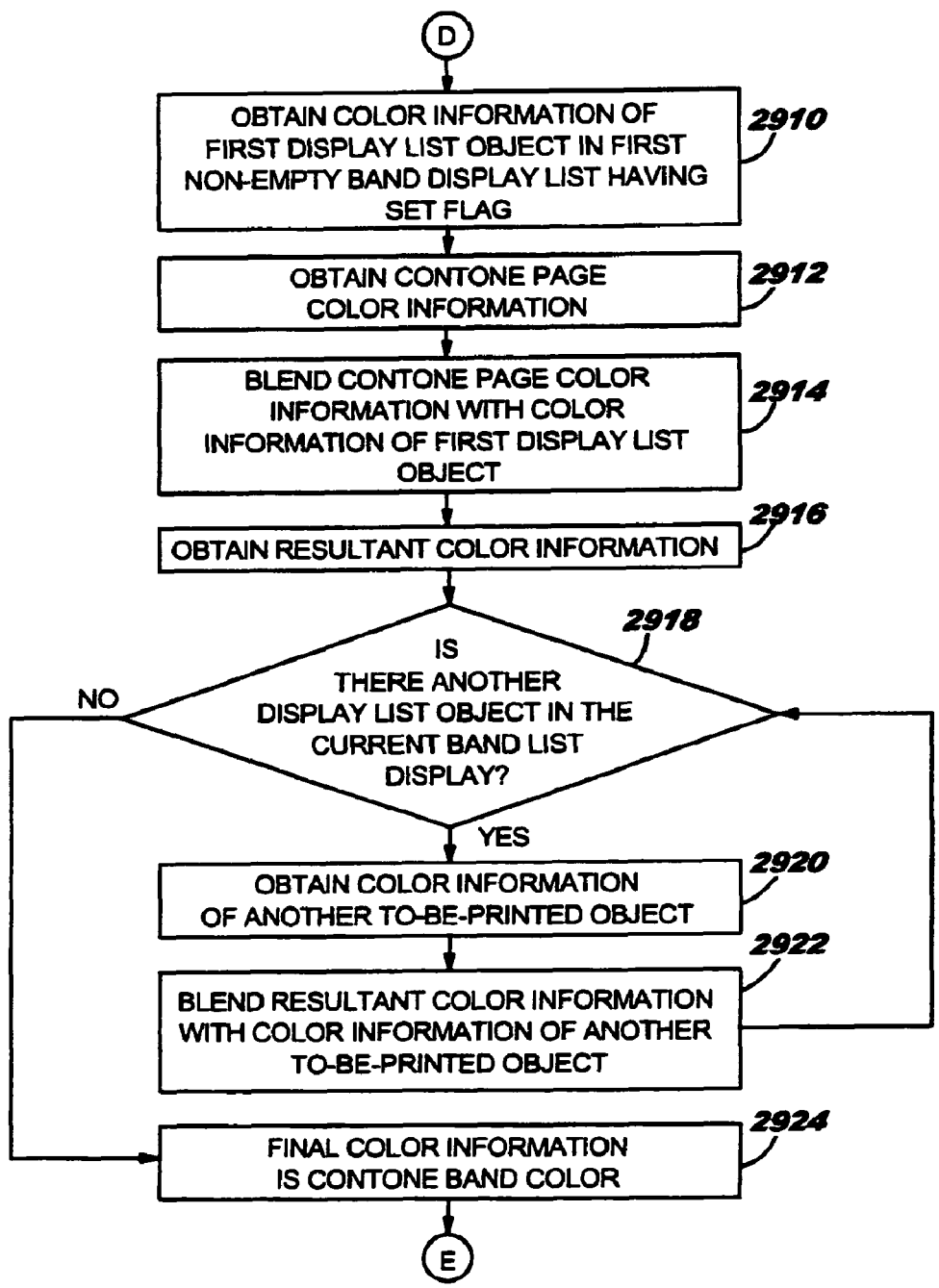
FIG. 29 is a flow chart in accordance with the teachings of the present invention of the blending operations to create a contone band.

In flow chart form, with reference to FIG. 29, the rendering of bands with band display lists having a flag set therein occurs by the graphics engine first obtaining the color information for both the first display list object in the first non-empty band display list (step 2910) and the contone page (step 2912). Then, the graphics engine blends the two color informations, step 2914, to create a resultant color information, step 2916. As before, the blending preferably occurs in accordance with the math or logic function specified by the PDL file for the ink attribute of the to-be-printed object. It is possible that an object will be received by the graphics engine that has a different color space than that of the contone page. In such instances, this step may be preceded with a color conversion step to get the object color space into that of the contone page. For example, if an object is received with a K color space and the color space of the contone page is in r, g, b, the K is converted into r, g, b before step 2914 begins. Similarly, if the received object is in 1 bit per pixel r, g, b, form (e.g., 1, 1, 1), it would require conversion to 8 bit per pixel form (e.g., 11111111, 11111111, 11111111) before commencing step 2914. Continuing with the flow chart, in the event another display list object exists on the band display list, step 2918, its color information is obtained, step 2920. The graphics engine then blends the latest color information with the previously obtained resultant color information, step 2922. The process then repeats until all color information of all the object display lists have been sequentially blended, step 2924. The ultimate or final color information corresponds to the color of the contone band.

Figure 30:
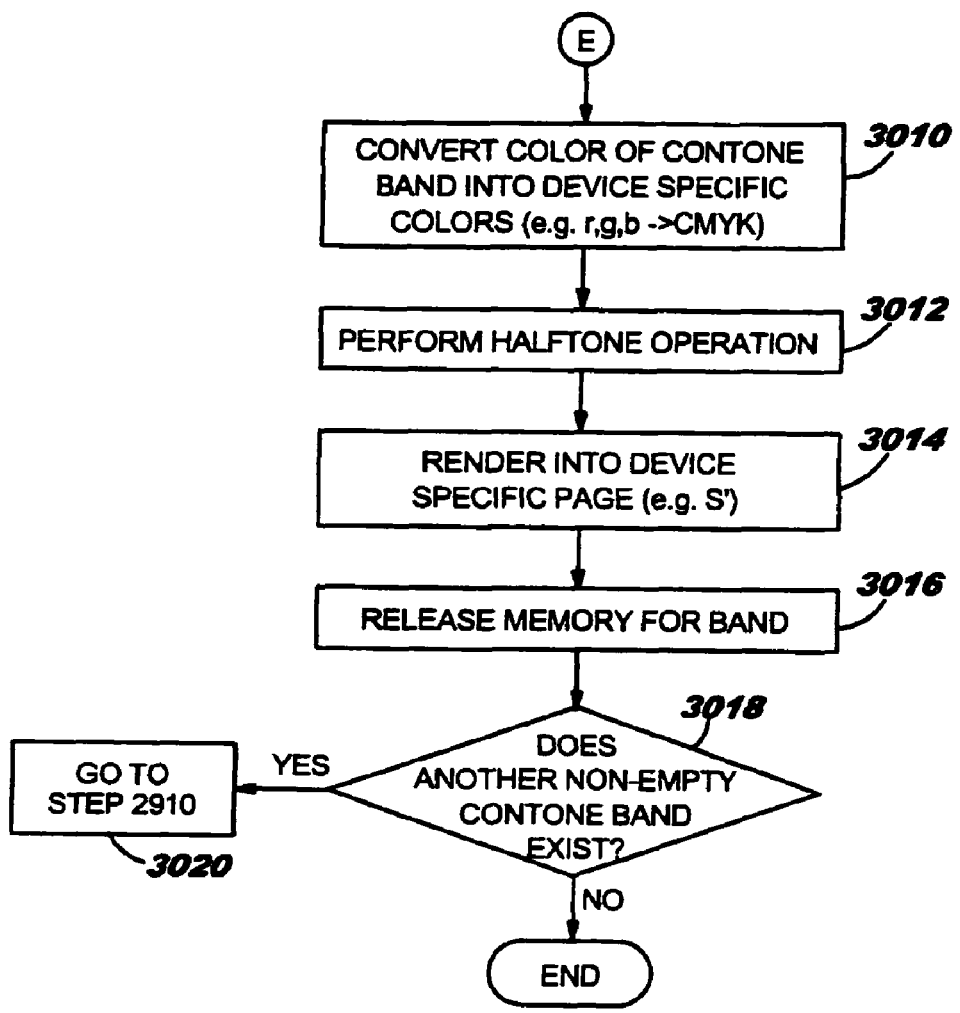
FIG. 30 is a flow chart in accordance with the teachings of the present invention of the processing done on contone bands.
Figure 31A:
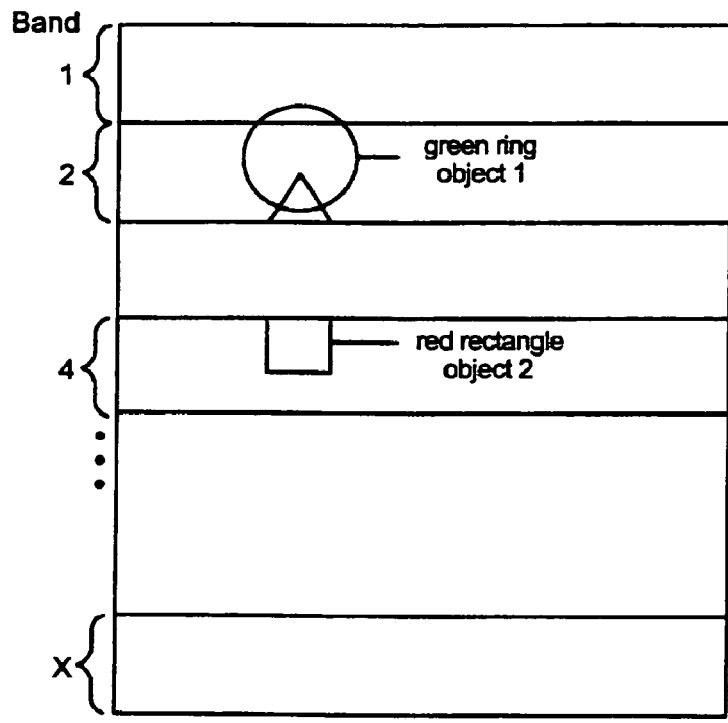
FIGS. 31A-31B are diagrammatic views in accordance with the teachings of the present invention of partially and fully processed device specific pages in memory.
Figure 31B:
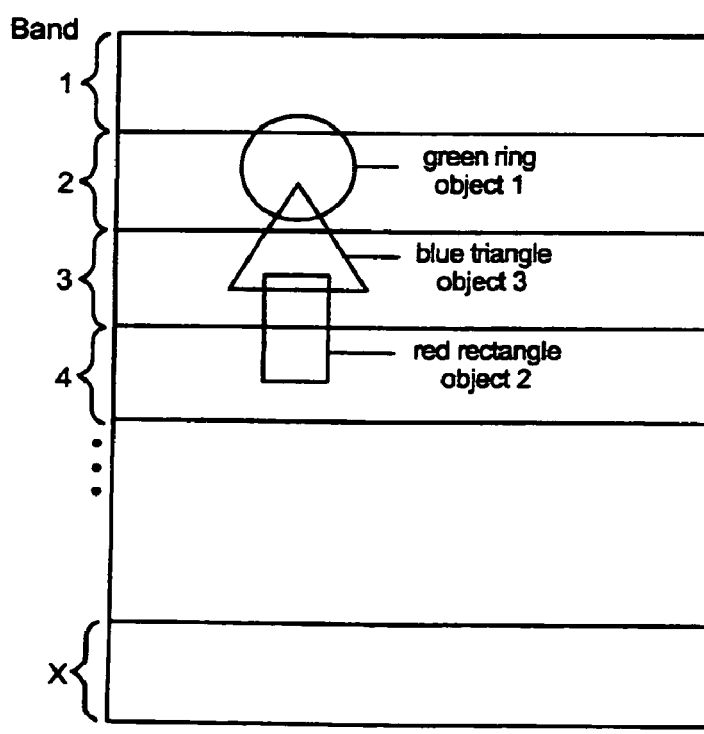

In FIG. 30, each of the contone band colors are rendered into a device specific band in memory to complete the processing herein. Such rendering may occur at the end of processing all contone bands, at the end of processing each contone band or at some other desired time. At step 3010, the graphics engine converts the color information of a given contone band into device specific color. In our example, this would be the conversion of r, g, b, into CMYK. Of course, many color spaces are known and the invention should not be so limited to these two color spaces. At step 3012, the graphics engine performs a well known halftone operation for the to-be-printed objects in the band. At step 3014, the objects are rendered into a device specific page in memory and the memory of the contone band is released or freed, step 3018, so the graphics engine or other structures can use it for future operations as necessary. In our example, the device specific page in memory corresponds to S' as representatively seen in FIG. 31A. Artisans will appreciate, however, the process for bands 1 and 4 has already occurred and so band 3 is the only band to remain. Thus, at step 3018, the graphics engine assesses whether any other contone bands exist, and if they do, the process beginning with step 2910 repeats. In our example, the device specific page S' in memory will eventually become fully rendered (FIG. 31B). In other embodiments, however, the rendering may occur with each band being taken in order instead of having the bands without flag attributes set being rendered first followed by the rendering of bands having flag attributes set. In either event, the graphics engine can now hand-off the final bitmap, rendered in device specific colors and halftoned, S', to the engine interface 216 (FIG. 2) so it can invoke the print mechanisms 218, as needed, to actually print the to-be-printed page.

In general, it is known to have either host based control of printing or to have device or printer based control of printing. Heretofore, printer based control has been exclusively described. In an alternate embodiment, however, the foregoing could be implemented through host-based control wherein the printer driver, installed on the host from some sort of software media, e.g., optical disk 131 (FIG. 1), alone or in combination with the computer 120, could perform the above-described processing through the implementation of computer-executable instructions on the driver or elsewhere. In still another embodiment, although the foregoing has been described in relationship to a laser printer, e.g., 161, no reason exists why this could not extend to inkjet printers, fax machines, copy machines, monitors, or other output-type rendering devices that provide output renditions for a given input.

The present invention has been particularly shown and described with respect to certain preferred embodiment(s). However, it will be readily apparent to those skilled in the art that a wide variety of alternate embodiments, adaptations or variations of the preferred embodiment(s), and/or equivalent embodiments may be made without departing from the intended scope of the present invention as set forth in the appended claims. Accordingly, the present invention is not limited except as by the appended claims.

What is claimed:

1. A method of processing a to-be-printed page of a print job in a device, said to-be-printed page having a plurality of to-be-printed objects thereof, comprising:
   constructing a display list object for said to-be-printed object, a band display list for a band of said to-be-printed page and a contone band;
   setting a flag or not corresponding to a condition of one of said display list object and said band display list;
   blending color information of overlapping pixels of said plurality of to-be-printed objects, said blending occurring in creating said contone band; and
   rendering said contone band in a device specific band in memory of said device.

2. The method of claim 1, wherein said blending further includes constructing a contone page.

3. The method of claim 2, wherein said blending further includes blending color information of a pixel of said to-be-printed object with a pixel of said contone page to create a pixel of resultant color information.

4. The method of claim 3, wherein said rendering further includes converting said resultant color information into a color space of said device.

5. A method for processing a to-be-printed page of a print job in a device, said to-be-printed page having a plurality of to-be-printed objects thereof, comprising:
   dividing said to-be-printed page of said print job into a plurality of bands;
   constructing a contone page for color information of said to-be-printed page, said color information being in a first color space;
   on a band-by-band basis, blending color information of said to-be-printed objects with said color information of said contone page to create a plurality of contone bands.

6. The method of claim 5, further including on said band-by-band basis, blending color information of one of said to-be-printed objects with another of said to-be-printed objects.

7. The method of claim 5, further including converting color information of said contone bands into a second color space of said device.

8. The method of claim 7, further including performing a halftone operation.

9. The method of claim 5, further including rendering said to-be-printed objects into a device specific page in a memory of said device.

10. The method of claim 5, further including freeing memory locations for said contone bands.

11. The method of claim 5, further including constructing a band display list for each said plurality of bands that contain said to-be-printed objects therein.

12. The method of claim 11, further including determining whether a flag corresponding to said constructed band display lists is set or not.

13. The method of claim 12, further including constructing a display list object for each said plurality of to-be-printed objects.

14. The method of claim 13, further including determining whether a math or logic function of an ink attribute of said constructed display list objects requires a hard processing operation.

15. A method for processing a to-be-printed page of a print job in a device, said to-be-printed page having a plurality of to-be-printed objects thereof, comprising:
- dividing said to-be-printed page of said print job into a plurality of bands;
- for at least one of said bands, constructing a contone band for blended color information of overlapping pixels of said to-be-printed objects, said blended color information being in a first color space.

16. The method of claim 15, wherein said constructing further includes constructing a contone page for color information of said to-be-printed page.

17. The method of claim 16, wherein said constructing said contone band further includes blending pixels of said contone page with pixels of one of said to-be-printed objects.

18. The method of claim 15, further including rendering said to-be-printed objects into a device specific page in memory of said device, said device specific page being in a second color space different than said first color space.

19. The method of claim 18, further including freeing memory locations corresponding to said contone band.

20. The method of claim 15, further including constructing a band display list for each said plurality of bands that contain said to-be-printed objects therein.

21. The method of claim 20, further including determining whether a flag corresponding to said constructed band display lists is set or not.

22. The method of claim 15, further including constructing a display list object for each said plurality of to-be-printed objects.

23. The method of claim 22, further including determining whether a math or logic function of an ink attribute of said constructed display list objects requires a hard processing operation.

* * * * *